United States Patent

Meyn et al.

[11] Patent Number: 5,859,623
[45] Date of Patent: Jan. 12, 1999

[54] INTELLIGENT DISPLAY SYSTEM PRESENTATION PROJECTION ARRANGEMENT AND METHOD OF USING SAME

[75] Inventors: Catherine K. Meyn, Carlsbad; Lane T. Hauck, San Diego; Terry R. Hicks, San Diego; Robert A. Rejent, Jr., San Diego; David L. Ambrose, Poway, all of Calif.

[73] Assignee: Proxima Corporation, San Diego, Calif.

[21] Appl. No.: 645,608

[22] Filed: May 14, 1996

[51] Int. Cl.$^6$ .................................................. G09G 5/00
[52] U.S. Cl. .............................................. 345/1; 345/508
[58] Field of Search ........................... 345/1, 7, 87, 157, 345/173, 330, 331, 508, 511

[56] References Cited

U.S. PATENT DOCUMENTS 5,448,263  9/1995  Martin ...................................... 345/173
5,526,011  6/1996  Hix et al. .................................. 345/87
5,594,468  1/1997  Marshall et al. .......................... 345/87

*Primary Examiner*—Matthew Luu
*Attorney, Agent, or Firm*—Higgs, Fletcher & Mack LLP; Bernard L. Kleinke

[57] ABSTRACT

An intelligent display system presentation projection arrangement and method include the conversion of presentation display information into portable document format information for supplying it to an intelligent display system, which subsequently converts the portable document formation information to presentation display information. A controller responds to the converted information for controlling a projection display unit for causing the display presentation images to be projected onto a remotely located viewing surface. The intelligent display system of the arrangement replaces the separate computer with a unit which is either connected to the projection display unit, or incorporated therein. By utilizing the conversion to portable document format information, any computer platform may be employed, and the information is displayed at the highest resolution available to the projection display unit.

18 Claims, 6 Drawing Sheets

| 1 | REVERSE KEY returns to the previous slide |
| 2 | FORWARD KEY advances to the next slide |
| 3 | PAUSE KEY pauses during a presentation or continues from a pause |
| 5 | MOUSE DISK |

INTELLIGENT DISPLAY SYSTEM PRESENTATION PROJECTION ARRANGEMENT AND METHOD OF USING SAME

CROSS-REFERENCE TO RELATED APPLICATIONS

This patent application is related to U.S. Pat. Nos. 5,321,450; 5,400,095 and 5,453,803, each of which being incorporated herein by reference, as if fully disclosed herein.

1. Technical Field

The present invention relates in general to a presentation projection arrangement and method of using it. It more particularly relates to an intelligent display system used for controlling a projector unit, which is used to project computer generated and other images for presentations in meeting rooms.

2. Background Art

Liquid crystal display (LCD) units have been incorporated in projectors for projecting computer generated and other images to a remote viewing surface, such as a screen. Personal computers, such as desktop or laptop computers, have been connected to the LCD projectors to provide presentation information thereto so that the projection equipment could project the enlarged images onto the screen.

The resolution of the projected image is dependent upon the resolution of the personal computer, and thus is limited thereto. Additionally, the signal from the computer must be converted from digital to analog to enter the projector input system, which then converts the analog signal back to digital.

Thus, this projection technique necessitates that the presentation is limited by resolution, available suitable presentation software and the computer platform. The multiple signal conversions can degrade the image. The requirement of having a separate computer adds weight, tables and attendant inconvenience.

Hence, it would be highly desirable to have a new and improved technique which would enable the user to utilize conventional application software for developing presentation image information to be utilized by an LCD projector unit. Such a technique should be independent of resolution of the computer, and its platform. Also, the technique should avoid multiple signal conversion to reduce the degradation of the resulting projected image. Also, the requirement for a separate computer and associated cabling should be eliminated.

DISCLOSURE OF INVENTION

Therefore, the principal object of the present invention is to provide a new and improved intelligent display system presentation projection arrangement and a method of using it, wherein the arrangement does not require a separate computer for controlling a projector unit for generating a projected image.

Briefly, the above and further objects of the present invention are realized by providing a new and improved intelligent display system presentation projection arrangement and a method of using same, whereby a separate computer and its associated cabling are eliminated.

An intelligent display system presentation projection arrangement and method include the conversion of presentation display information into information in a portable document format for supplying it to an intelligent display system, which subsequently converts the portable document format information to presentation display information. A controller responds to the converted information for controlling a projection display unit for causing the display presentation images to be projected onto a remotely located viewing surface.

The intelligent display system of the arrangement replaces the separate computer with a unit which is either connected to the projection display unit, or incorporated therein. By utilizing the conversion to portable document format information, any computer platform may be employed, and the information is displayed at the highest resolution available to the projection display unit. The necessity for connecting cables between a separate computer and the projection unit is completely eliminated.

In this manner, the presentation display information is developed on a separate computer at a remote location, such as at the user's office on a personal computer. The presentation display information is then converted into the portable document format information, which can be conveniently stored in a compressed format on a diskette or other conventional storage media. Thus, the diskette or other storage medium is then used to load the information into the intelligent display system for the projection display unit in the meeting room or a conference room where the presentation information is to be projected onto the viewing surface.

By utilizing the portable document format information stored on the storage media, universal data format for image information is achieved. In this manner, computers of various types running various presentation software and various operating systems can store images in a single portable format. This facilitates moving images between computers, operating systems and application programs. The universal image storage format enables the storing of many types of data, for example graphics, animation and sound. With such a universal format, new and unforeseen data types may be added in the future with little or no detrimental affects on the previously installed systems.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
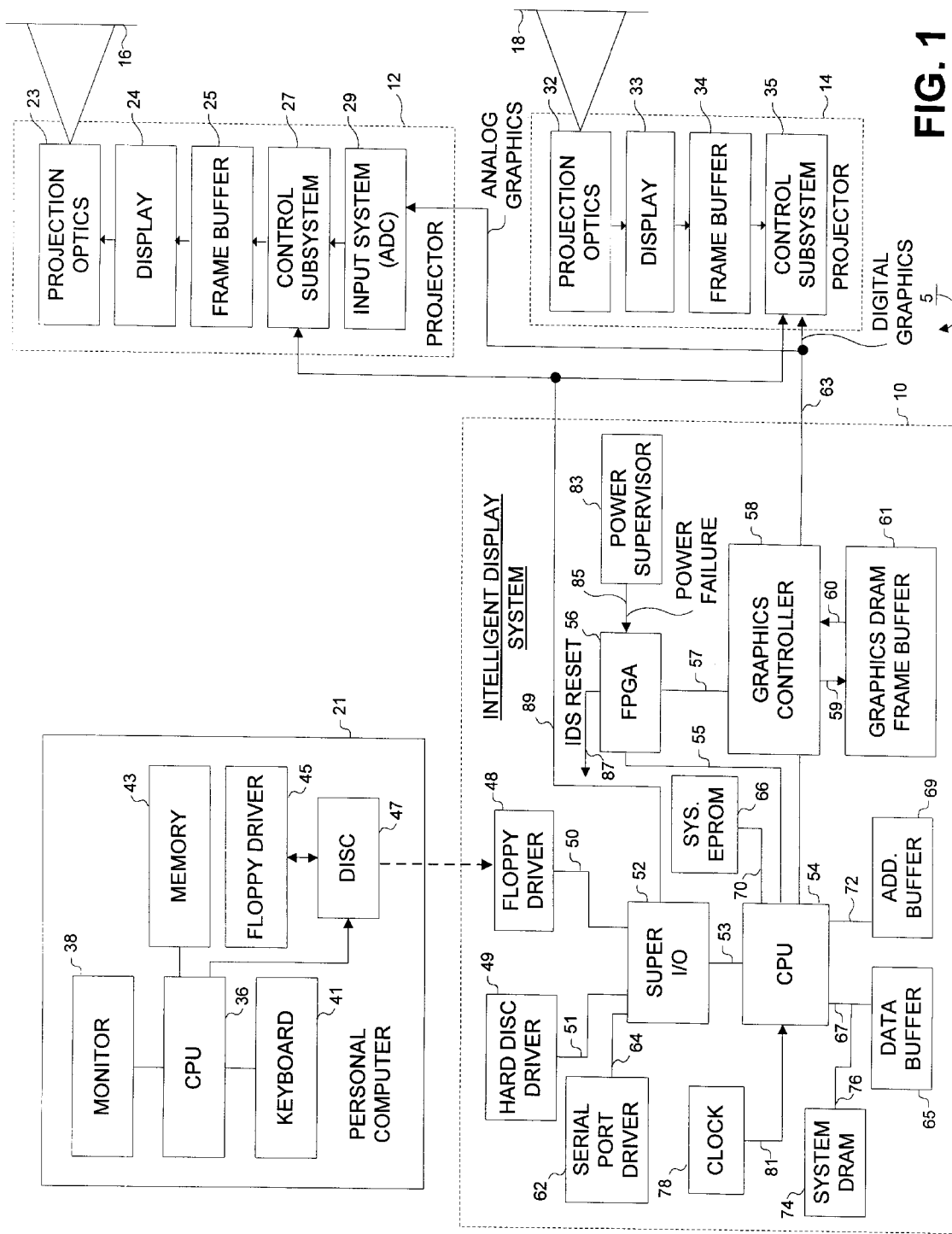
FIG. 1 is a system block diagram of the intelligent display system presentation projection arrangement, which is constructed in accordance with the present invention.
Figure 2:
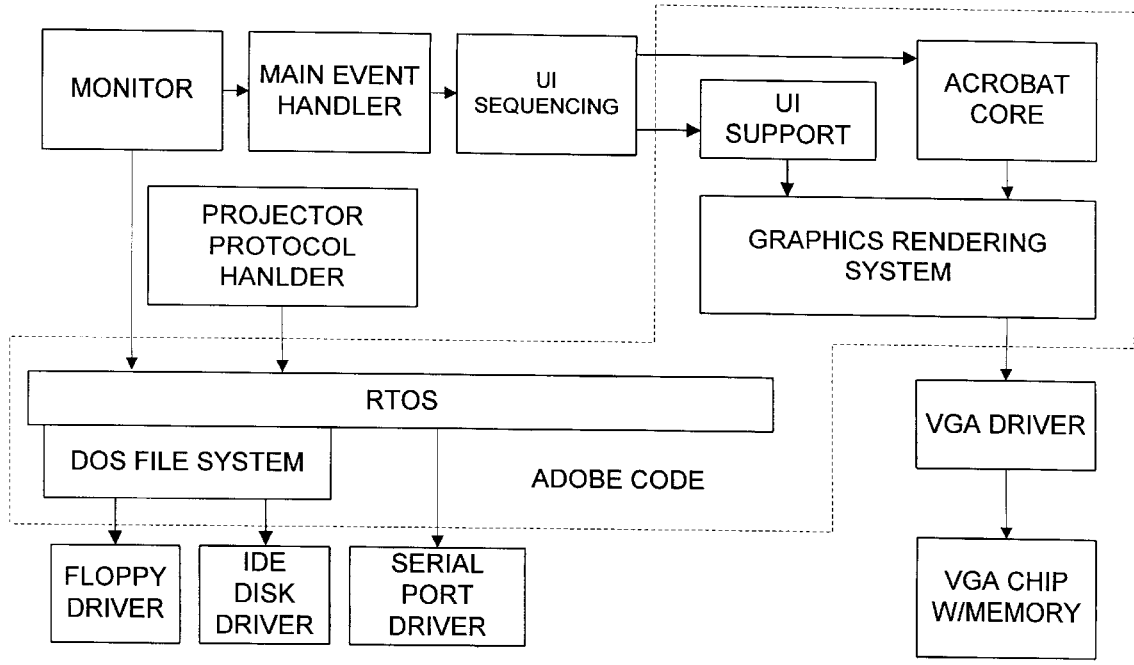
FIG. 2 is a block diagram of a portion of the intelligent display system of the presentation projection arrangement of FIG. 1, illustrating the arrangement of software for controlling the system.

Referring now to the drawings, and more particularly to FIG. 1 thereof, there is shown a presentation projection arrangement generally indicated at 5, which is constructed in accordance with the present invention. Arrangement 5 generally comprises an intelligent display system (IDS) 10, which is adapted to control a pair of projection display units, such as a projector 12 and a projector 14, either independently or simultaneously. The projectors 12 and 14 are adapted to project computer generated or other images onto a remote viewing surface, such as the respective screens 16 and 18.

The arrangement 5 generally includes a personal computer 21, which may be a conventional International Business Machines compatible computer, or an Apple Macintosh compatible computer for storing and executing presentation information to be used for displaying presentation images via the projectors 12 or 14. The computer 21 can store and execute conventional application software programs for developing presentations, such as slide presentations and others, for projection purposes before a group of people in a meeting or conference room.

The projectors 12 and 14 are integrated display panel projectors. For example, reference may be made to U. S. Pat. Nos. 5,321,450; 5,400,095; and 5,453,803, each of which discloses an integrated display panel projector, the subject matter of each of said patents being incorporated herein by reference. For other examples of such projectors and projection equipment employing display panels, such as liquid crystal displays (LCD), reference may be made to U.S. Pat. Nos. 5,300,944; 5,264,835; 5,499,036; and 5,459,484, each of which is incorporated herein by reference as if fully disclosed herewithin.

Considering now the projector 12 in greater detail, it generally comprises a projection optics system 23 for projecting the display presentation images onto the remotely located screen 16. A display panel 24 is an LCD panel which forms the display presentation image for projection by the optics system 23. A frame buffer 25 cooperates with a control subsystem 27, which includes circuits for providing images on a frame-by-frame basis to the display 24. In this regard, the control subsystem 27 causes a sequence of frames of presentation information to be compiled in the frame buffer 25, and then transferred to the LCD panel 24 for projecting a frame of information via the projection optics 23. This operation is repeated sequentially for the entire presentation.

An input system 29 is in the form of an analog-to-digital converter which converts the analog graphics information from the intelligent display system 10 to digital information for the control subsystem 27. It should be understood that there can be more than one input to the system 29, whereby the projector 12 may be driven by a separate conventional computer (not shown).

Considering now the projector 14 in greater detail, it is generally similar to the projector 12, and includes a projection optics system 32, an LCD display panel 33, and a frame buffer 34, which cooperates with a control subsystem 35 in a similar manner as the projector 12. It should be understood that while the projector 14 does not require a separate input system for analog-to-digital conversion, such as the system 29 of the projector 12, such an input system may be provided to enable the projector 14 to receive analog graphic information in a similar manner as the projector 12. However, the intelligent display system 10 provides digital graphics information directly to the control subsystem 35. In this manner, the projector 14 may not require the analog-to-digital conversion input system, and thus can be less expensive to manufacture.

Considering now the personal computer 21 in greater detail, it includes a computer processor unit (CPU) 36, which drives a monitor 38 and receives user input information from a keyboard 41. The personal computer 21 serves as a presentation developmental unit which is utilized by the user in a conventional manner using conventional application software to develop presentation information for projection by either one of the projectors 12 or 14, or both of them.

A memory 43 stores a computer program, which is executed by the computer processor unit 36 to convert the presentation display information into universal portable document format information. In this regard, portable document format file conversion software is stored in the memory 43, and is preferably software sold by Adobe under the tradename Adobe Acrobat Exchange. In this regard, the Acrobat Exchange software as executed by the computer processor unit 36 converts the presentation display information developed by the personal computer 21 into a portable document format information in the form of a print file. The portable document format is independent of the application software or the computer platform. It has a universal image storage format capable of storing many different types of data, such as graphics, animation and sound. The universal data format for image information enables computers of various types and kinds running various presentation software to store images in a single format. It facilitates moving images between computers, operating systems and application programs. With such a universal data format, the projectors 12 and 14 require only one image interpreter software module.

A floppy drive 45 enables the portable document format information to be stored on a diskette 47. In this manner, the portable document format (PDF) information is compressed so that large presentations, such as slide presentations, developed by the personal computer 21 can be conveniently stored on a single diskette or a series of diskettes. The diskette 47 can then be used to load the portable document format information into the intelligent display system 10 as hereinafter described in greater detail.

As a result of the novel arrangement 5, a user can develop a presentation using conventional presentation application software on his or her personal computer at his or her office in a conventional manner. Thereafter, the entire presentation can be stored on conventional storage media, such as a diskette 47. The diskette 47 can then be taken to a remote location, such as a meeting room where the intelligent display system 10 and the projectors 12 and 14 are located, and the diskette 47 can simply be loaded into the system 10 to program it for automatically or semiautomatically, and interactively, controlling the projectors. Alternatively, the diskette 47 can be loaded into the intelligent display system 10, which can then be transported with the user via a means of transportation, such as an airplane, to a distant location, such as a different city or state. In this regard, the intelligent display system 10 and the projectors 12 and 14 are compact in size and readily transportable. Thus, the presentation can then be displayed in a convenient manner at the user's destination, with the need to take along the personal computer 21.

Considering now the intelligent display system 10 in greater detail, it includes a floppy drive 48 for receiving the diskette 47 to load the portable document format information into the system 10. The floppy drive 48 is connected via a cable 50 through an input/output unit 52 through a cable 53 to a computer processor unit 54. The computer processing unit 54 can then execute the portable document format information by converting it back to presentation display information for driving either one or both of the projectors 12 or 14 as hereinafter described in greater detail.

A hard disk drive 49 is connected via a cable 51 to the input/output unit 52 so that a number of presentations may be stored thereon for future use. In this regard, a number of different presentations or a single presentation stored on a plurality of floppy diskettes, may be stored on the hard disk memory unit of the disk drive 49. Additionally, a serial port 62 is connected via a cable 64 to the super input/output unit 52, whereby the personal computer 21 can be connected directly via its serial port (not shown) of the computer processor unit 36 for directly driving the intelligent display system 63, if desired.

The input/output unit is a National Semiconductor integrated circuit marketed under the trade name "SUPER I/O" chip, under part number PC87332VLJ. The computer processor unit 54 is preferably a Motorola integrated circuit 68EC040.

In order to convey graphic information to the projectors, a field programmable gate array 56 is coupled to a port of the computer processor unit 54 via a bus 55, whereby the logic of the gate array 56 receives the graphical output information from the computer processor unit 54 and supplies it via a bus 57 to a graphics controller 58. The controller 58 supplies information to and from a graphics dynamic random access memory frame buffer 61 via the respective buses 59 and 60. In this manner, a frame-by-frame representation of the information is developed in the frame buffer 61 and then is transferred via a cable 63 to either the input system 29 of the projector 12, or the control subsystem 35 of the projector 14, or both simultaneously. In this regard, the graphics controller 58 is preferably an integrated circuit marketed under the tradename Cirrus GD 7543, which enables either analog graphic information to be transferred to the input system 29 of the projector 12, or digital information directly to the control system 35 of the projector 14, or both simultaneously. Also, the controller 58 is able to function in a multi-tasking manner of operation. In this manner, both of the projectors 12 and 14 can function simultaneously to display two different images, where desired.

The gate array 56 serves an interfacing function between the computer processor unit 54 and the other subsystem components of the system 10.

In order to facilitate the functioning of the computer processing unit 54, a conventional data buffer 65 is connected via a bus 67 to the computer processing unit 54, and an address buffer 69 is coupled via a bus 72 to the computer processor unit 54. A system dynamic random access memory 74 is connected via a bus 76 to the bus 67 extending between the computer processor unit and the data buffer 65 for communication purposes to facilitate the operation of the computer processor unit 54.

The intelligent display system 10 receives its electrical power from either one or both of the projectors 12 and 14 via cables (not shown). A power supervisor 83 monitors the power provided by the projectors. In this regard, the power supervisor 83 is a comparator, and compares the voltage of the power supply to the system 10 with a desired voltage, such as 4.75 volts. In this regard, if less than 4.75 volts is being supplied by the projectors, the power supervisor 83 generates a signal POWER FAILURE via a lead 85 to the field programmable gate array 56, which in turn generates a signal IDS RESET via a cable 87 to the other components of the intelligent display system 10 so that each component will be reset should the power level fall below the predetermined acceptable voltage of 4.75 volts. Once the power is restored to the desired level, the signal IDS RESET terminates and power is thereafter operation of the system 10 proceeds normally.

A cable 89 is connected between the super input/output unit 52 and the projectors 12 and 14 to provide control messages on two different channels (COM1 and COM2) between the control subsystems 27 and 35 of the respective projectors 12 and 14, and the super input/output unit 52 of the system 10. In this regard, the projectors can send messages via the cable 89 on the channel COM1. The messages can include an idle/reset message, a display state message, or the like. In this regard, for example, when the system 10 is supplying the graphics information on a frame-by-frame basis to the projectors, should the projectors not receive a certain frame properly, a message can be sent from the projector via the cable 89 in digital form using the COM1 channel to request the system 10 to repeat the last frame information. The other channel COM2 can be used for maintenance operations.

A system electrical programmable read only memory (EPROM) 66, is connected via a bus 70 to the computer processor unit 54, and via a bus 71 to the field programmable gate array 56. The memory 66 stores a program to convert the portable document format information contained in the floppy drive 46 on the diskette 47, or alternatively, copied onto the hard disk drive memory 49, into presentation display information suitable for driving either one or both of the projectors 12 and 14 via the graphics controller 58. In this regard, the memory 66 stores a program marketed by Adobe Systems Inc. in Mountain View, Calif. under the trade name Adobe Acrobat Player to convert the portable document format files back to the presentation display information for the graphics controller 58, which, in turn, supplies the presentation display information on a frame-by-frame basis to either one or both of the projectors 12 or 14. Alternatively, the Adode Player software may be stored in the hard disc drive 49.

IDS COPROCESSOR

The chip FPGA 56 contains seven main functional block.

1. The CORE provides the interface to CPU in one side and every I/O in other side. Unlike the 68020 and 68040 CPU, the 68EC040 does not support dynamic bus sizing, therefore CORE provides some basic function of dynamic bus sizer.

2. The DRAM CONTROLLER provide an easy interface between dynamic RAM arrays and 8, 16, 32 and 64-bit microprocessors.

3. The GRAPHICS interfaces the Cirrus Logic Graphics Controller GD7541/GD7543 to CPU through VESA VL_BUS Local bus. It also provide bus swap to achieve maximum display performance for 8, 16, 24, and 32-bit.

4. The I/O provides the interface between CPU and National Semiconductor Superio chip PC87332VLJ through AT bus (ISA), it also interface with SCSI controller on daughter board.

5. The INTERRUPT provides interrupt encoder, interrupt mask register, and interrupt acknowledge.

6. The TIMER provides 16-bit read/write and 8-bit read/write counters for Software scheduler. The operation range is from about 41 ns to 1 sec.

7. The STATUS provides system reset and system status.

FPGA contains a 8-bit bi-directional data interface and operates synchronously with CPU at 24 Mhz. It is packaged in 160 pin Plastic Quad Flatpack (PQFP) and operates between 0 to 70 degree C.

FPGA design is target to Actel ACT3 A1440 TODAY because a lot of reasons:

Low cost (Standard speed)

Lowest power (Max: 1 watt)

FPGA design is implemented with compact VHDL code therefore only 70% of gate, 65% of routing resources inside A1440 is used. Only 114 in total 125 I/O signals are used.

In the future with new and better technology (4 or 5 layers, better floor layout software, 0.35-micron technology), we can target this design to any FPGA which meet requirements.

CPU interface

CPUA(31:0)

These three-state bi-directional signals from CPU provide the address of the device that CPU want to access (For example: Instruction fetch from EPROM, read from or write to System Dram, read from or write to Video Dram, read from or write to SCSI controller etc.). Bit 31 is the MSB and bit 0 is the LSB. These signals are input to IDS coprocessor FPGA. CPU uses the address bus CPUA (31:0) to specify the address for a data transfer and the data bus BD(31:0) to transfer the data. CPU's control signals indicate the beginning and type of a bus cycle as well as the address space and size of the transfer (I,16 or 32 bits of data per bus transfer, during a burst transfer, the data lines are time-multiplexed to carry all 128 bits of burst request using four 32-bit transfers). FPGA uses CPU address and control signals to decode and send signals to select I/O device from that I/O device can communicate with CPU. Because FPGA knows how long it takes for each I/O device to do a transfer and which types of CPU transfer cycle, it can control the length of the cycle by terminating cycle and send acknowledge signals to CPU properly.

BD (7:0)

These three-state bi-directional signals provide the data path between CPU and FPGA. Bit 7 is the MSB and bit 0 is the LSB. This bus is used to transfer data, commands, and status between them.

Transfer Type (TT1, TT0)

These input signals from CPU indicate the type of access for current bus transfer.

Transfer Size (S1Z1, ZIZ0)

These input signals and CPUA1, CPUA0 signals from CPU determine the position of the bytes. The size indicated on the S1Z1/S1ZO signals corresponds to the size of the operand transfer for the entire bus cycle. During an operand transfer, CPUA(31:2) indicate the long-word (32 bits) base address for the first byte of the operand to be accessed; CPUA1/CPUA0 indicate the byte offset from the base. For a burst inhibited line transfer, CPUA1/CPUA0 are don't care. CPUA3/CPUA2 value increment from 01 for first long word to 10 for second, 11 for third, 00 for fourth long word.

Transfer Start (TS)

CPU asserts this signal to FPGA for one clock period (24 Mhz clock, 41 ns for clock period) to indicate the start of each transfer.

Transfer in Process (TIP)

When CPU asserts this signal to FPGA, it indicates that a bus transfer is in progress.

Read/Write (R/_WR)

This input signal from CPU to FPGA defines the data transfer direction for the current bus cycle. A high level indicates a read cycle, and a low level indicates a write cycle.

Transfer Acknowledge (CPUTA)

This output signal from FPGA to CPU indicates the completion of a requested transfer operation, and CPU samples it to detect the completion of each bus transfer. This signal is about 41 ns (24 Mhz clock) and must meet set up and hold time.

Transfer Error Acknowledge (TEA).

FPGA asserts this output signal to indicate an error condition for the bus transaction. After 24 ms from time FPGA received Transfer Start (TS), if select I/O device is not response. FPGA issues TEA signal to CPU.

Transfer Burst Inhibit (TBI)

This output signal from FPGA indicates to the CPU that the accessed device cannot support burst mode accesses and that the requested line transfer should be divided into individual long-word transfers. Asserting Transfer Brust Inhibit (TBI) and Transfer Acknowledge (TA) terminates the first data transfer of a line access, which causes the processor to terminate the burst and access the remaining data for the line as three successive long-word transfers.

Interrupt Priority Level (IPL[2:01])

These outputs signals from FPGA provide an indication of an interrupt condition. IPL2 is the most significant bit and IPL0 is the east significant bit. They are active LOW signal.

When a I/O device requires the service of the CPU or it is ready to send information that the CPU requires, it can signal the CPU to take an interrupt exception through the FPGA's INTERRUPT encoder circuit. When an interrupt request has a priority higher than the value in the priority mask, CPU makes the request a pending interrupt. Priority level 7, the nonmaskable interrupt (NMI) is highest level of interrupt (IPL[2:0]=000). Priority level 0 (IPL[2:0]=111) is no interrupt requested.

Interrupts (All signals are input to FPGA with order from High to low priority interrupt)

Power fail interrupt (~FPON)

This is highest level interrupt (NMI). In the event of a brownout of power failure, power supervisor circuits asserts ~PFON signal.

Floppy disk interrupt (FPINT)

In general FPINT will be generated under two conditions:

During read data transfer from Floppy disk controller to CPU, if the number of bytes in the Superior's FIFO is greater or equal to threshold.

During write data transfer from CPU to Floppy disk controller, if the number of bytes in the FIFO is less than or equal to threshold.

Hard disk interrupt (HDDINT)

RS232 serial communication 1 interrupt (PCIRO3)

This is active high interrupts associated with the con 1 serial port.

RS232 serial communication 2 interrupt (PCIRO4)

This is active high interrupts associated with the com2 serial port.

Software scheduler interrupt (MFPIRON, internal FPGA)

This is active low signal associated with FPGA's TIMER function.

Graphics controlled GD7543 interrupt (VGAINT) When this signal is active, Graphics controller has reached the end of an active field.

SCSI interrupt (SCSIINTN)
This is lowest priority interrupt.
DRAM controller
Dram (11:0)
These output signal are multiplexed outputs (row and column address) from FPGA's Dram Controller.
RAS(1:0)
These outputs are asserted to latch the row address contained in the Dram (11:0) bus into Dram.
CAS(3:0)
These outputs are asserted to latch the column address contained on the Dram (11:0) bus into Dram.
Dram write enable (~DRAMWE)
This output asserted specifies a write operation to the Dram. When negated, this output specifies a read operation to the Dram.
Dram 0 output enable (~DRB0OE)
Dram 1 output enable (~DRB1OE)
EPROM Control (FPGA's output)
EPROM bank 0 Chip select (~RB0CS)
EPROM bank 1 Chip select (~RB1CS)
EPROM output enable (~ROMOE)
Graphics Control
Graphics control Byte enable LBE (3:0)
These output signals indicate which bytes on the data bus are valid.
Address data strobe (~LADS)
The ~LADS output indicates that a valid address and a valid cycle definition are being drive on the CPU bus. The assertion of this signal marks the beginning of a bus cycle.
Write or Real (~LWR)
This output signal indicates whether a write or read operation is selected by the CPU. When it is high, a write occurs. When it is low, a read occurs.
Memory or I/O (~LMIO)
This output indicates whether a memory or I/O operation is to occur. When ~LMIO is high, a memory operation is selected. When ~LMIO is low, an I/O operation is selected.
Graphics ready (~RDYRTN)
The ~RDYRTN input indicates that Graphics control GD7543 has presented valid data on the data bus, or that the Graphics control GD7543 has accepted the CPU's data (through FPGA).
Ready return (~LRDY)
This output establishes a handshake between the Graphics control GD7543 and CPU (through FPGA) so that the GD7543 is informed when the cycle has ended.
Reset (~Vreset)
This output signal, when low, initializes the GD7543 to a known state.
Superio control
Address enable (AEN)
This active low output signal indicates a read or write cycle to Superio.
I/O write (~IOWR)
Active low output to signal a write from CPU to Superio, SCSI controller on Daughter board, and Hard drive.
I/O read (~IORD)
Active low output to signal a read from CPU to Superio, SCSI controller on Daughter board, and Hard drive.
I/O reset (IORST)
Active high output that resets the Superio or the idle state, and resets all disk interface outputs to their inactive states.
I/O channel ready (IOCHRDY)
Active low input signal from Superio, when IOCHRDY is driven low, Superio wants to extend the CPU cycle.
Miscellaneous signals Upper Data enable (~ENUPPER).
Active low output signal from FPGA to enable CPU's data bus to Graphics controller GD7543, Superio, Daughter board, and Hard drive.
Upper Data enable (~ENLOWER)
Active low output signal from FPGA to enable CPU's data bus to Graphics controller GD7543.
Graphics controller, Superio, Daughter board, and Hard drive data direction (DIR)
This output signal from FPGA defines the data transfer direction for the current bus cycle. A high level indicates a read cycle, and a low level indicates a write cycle.
SCST chip select (~SCSICS)
Active low output from FPGA to select SCSI controller on Daughter board
Software reset (~MR)
CPU writes to FPGA's register to reset a system when it need, in turn FPGA issues ~MR to reset IDS board.
Board status (~BOARDST)
When several exceptions occur simultaneously in CPU, CPU writes this information to FPGA's register and FPGA issues ~BOARDST signal low to turn on LED.
Daughter board reset (~DIORST)
FPGA issues this signal to reset Daughter board.
Floppy disk track 0 (~BTRK0)
This input signal from Floppy disk drive notifies FPGA that the read/write heads are positioned at the outermost track (track 0). The ~BTRK0 signal is invalid when power is turned on, and validated after seeking.
"LOW" Read/write heads on track 00
"HIGH" Read/write heads on other than track 00
Hard drive 16-bit data bus transfer request (~BIOCS16)
Hard drive data can be accessed on either 8-bit or 16-bit. When CPU issues command to access Hard drive in 16-bit mode. Hard drive will respond to request FPGA to set up the 16-bit data bus transfer.
Power on reset (~RESET)
Input to FPGA.
CLK24C
24 Mhz clock input to FPGA.
Platypus or Kanga reset (~IDSRST)
Input to FPGA
Manual reset (~JRST)
For debugged purpose.

OPERATION

Considering now the operation of the system 10 in greater detail, the system 10 eliminates the need to hook a computer up to the desktop projector. In this regard, the information generated by the presentation application software is initially converted into a portable document format (PDF) file. Subsequently, the PDF file is transferred to a disk for insertion into the disk drive of the system 10.

Using the system 10, a slideshow may be developed from substantially all existing graphics products. The resulting slideshow presentation is then converted to a special PDF file that the system 10 can read and run. Thus, the system 10 facilitates the use of existing files and training, and there is no need to learn a new presentation tool.

PDF files are generated form the presentation information using Adobe Acrobat Exchange software Print command. For example, where the PDF driver is selected as the printing device, the presentation information is stored as a PDF file.

The following terms and phrases appear in the following specification, and used as set forth in the description beside the term or phrase.

| Term | Description |
|---|---|
| Click a button | Choose a button in a dialog box that is projected on the screen. |
| Press a key | Press a physical key on the remote control, wand, or laser pointer. |
| Slide | A single image in a presentation. |
| Screen | The fabric or material onto which you are projecting an image. |
| Dialog box | A window projected onto the screen; dialog boxes usually offer options with various settings. |
| Presentation | A series of slides organized sequentially in a file. |

Prior to creating a PDF file, the Adobe Acrobat Exchange software is installed in the system 10 according got standard procedures. Subsequently, the conversion of presentation information into a PDF file according to the contents of the presentation information. In this regard, the Acrobat Exchange software includes utility software for conversion purposes: Acrobat Distiller and Acrobat PDF Writer.

Where the presentation information contains Encapsulated PostScript (EPS) artwork or images, or contains any PostScript-specific printer features (such as blends), Acrobat Distiller is used to generate a PDF file. If the presentation application software operates under DOS or UNIX, Acrobat Distiller must be used to generate a PDF file.

If the presentation information does not contain EPS images or special PostScript features, Acrobat PDF Writer may be used to generate a PDF file.

If it is uncertain as to whether the presentation information contains EPS images or PostScript-specific features, Acrobat PDF Writer should be used first. If the conversion to a PDF file is not performed correctly, return to the original field and use Acrobat Distiller to generate the PDF file.

As described above, the Acrobat Exchange software includes utility software called Acrobat PDF Writer. Using Acrobat PDF Writer, the Print command in a Windows or Macintosh presentation application software will save a copy of a document as a PDF file.

In general, the creation of a PDF file with Acrobat PDF Writer is accomplished according to the following steps:

1. Ensure that Acrobat PDF Writer is identified as the current printer driver;
2. enter the program application software and load the file; and
3. choose Print, choose the Print to File option, and print the file. For presentation application software in a Windows environment, the conversion steps are as follows:
1. start the presentation application software and load the file;
2. choose File, Print; IF the current printer is not Acrobat PDF Writer on DISK, click the Print Setup button. Select Acrobat PDF Writer on DISK from the Specific Printer list, then close the dialog box.
3. in the Print dialog box, click OK;
4. name the file, preferably using the filename extension .pdf, and select a destination folder;
5. if desired, the PDF file can be viewed in the Acrobat Exchange window; choose the View PDF File option or choose Prompt for Document Info; and
6. click OK.

For Macintosh presentation application software, the conversion steps are as follows:

1. start the presentation application software and load the file;
2. hold down the shortcut key (usually the Command or Apple key) and choose File, Print (If the PDF Writer dialog box does not appear, select Acrobat PDF Writer from the Chooser and try again);
3. in the Print dialog box, click OK;
4. name the file, preferably using the filename extension .PDF, and select a destination folder;
5. if desired, the PDF file can be viewed in the Acrobat Exchange window; choose the view PDF File option or choose Prompt for Document Info; and
6. click OK.

For Macintosh presentation application software the conversion steps are as follows:

1. start the presentation application software and load the file;
2. hold down the shortcut key (usually the Command or Apple key) and choose File, Print (If the PDF Writer dialog box does not appear, select Acrobat PDF Writer from the Chooser and try again);
3. select the Select Short (DOS) File Names option to truncate the default filename in the Save dialog box to a DOS filename (eight characters, a period, and a three-character file extension;
4. if desired, the PDF file may be viewed in the Acrobat Exchange window; select the View PDF File option or select Prompt for Document Info (The PDF file appears on screen if you selected the View PDF File option);
5. click OK. The Save As dialog box appears with the name of the PDF file; and
6. rename the field as needed. Select a destination folder, then click Save.

The Acrobat Distiller utility software is recommended for high-quality reproduction of EPS artwork, 24-bit images, and documents that take advantage of features available only on PostScript printers (such as blends). PDF files created by the Acrobat Distiller utility software maintain all the formatting, graphics, and photographic images that formed the original documents.

The Acrobat Distiller utility software creates PDF files from documents that have first been saved as a PostScript file. The saving of a document as a PostScript file is described hereinafter in greater detail.

Once a PostScript file is saved, there are several ways to convert PostScript files to PDF files using the Acrobat Distiller utility software. The quickest way to convert a file is to drag it onto the Acrobat Distiller icon. This places the converted file into the same folder as the source PostScript file, and adds the extension .PDF to the original filename.

In a windows environment, a PostScript file is saved according to the following steps:

1. check or choose a printer driver;
2. load the application and open the document;
3. choose File, Print (The print dialog box appears); and
4. choose Print to File (Specify the file name and add .PDF as the extension.

For Macintosh applications, a PostScript file is saved according to the following steps:

1. select Chooser if a PostScript printer driver has not already been chosen;
2. click the LaserWriter icon. Click the close box to close the Chooser;
3. load the application and open the document;
4. choose File, Print. The Print dialog box appears;
5. select File as the destination. If the document is a color document, or if it contains grayscale images, select the Color/Grayscale print option;
6. click OK (the Save As dialog box appears); and
7. select a destination and enter a name for the PostScript file. Add the extension ps to the file name.

Once the PostScript file has been created, it can be used to generate a PDF file.

In a Windows environment, a PostScript file may be converted, or distilled, into a PDF file according to the following steps:

1. double click the icon in the Adobe Acrobat program group;
2. use the Open command to load the file. Acrobat Distiller displays the Save As dialog box; and
3. specify a name (preferably with .PDF as the extension) or accept the default name.

For Macintosh applications, a PostScript file may be distilled into a PDF file according to the following steps:

1. double-click the Acrobat Distiller icon to start the program;
2. use the Open command to load the file. Acrobat Distiller displays the Save As dialog box; and
3. specify a name (preferably with .PDF as the extension) or accept the default name.

After creating a PCF file, the following steps enable the system 10 to customize a presentation:

1. plug in the projector and turn it on;
2. cycle to the customizing mode by entering a customizing command with an interface unit, such as a remote control. The Media Express title screen appears;
3. place a disk containing the PDF file into a floppy disk drive (IBM-formatted disks only); and
4. Enter the customizing command again to bring up a Presentation Selector dialog box.

To customize a presentation, three dialog boxes are utilized. One dialog box chooses the file, another dialog box adjusts the sequence of the slides, and a third dialog box adjusts timing and add transition effects.

Although the system 10 was intended to be operated by a remote control device or by a light activated control device such as the control device disclosed in U.S. Pat. No. 5,515,079, which patent is incorporated by reference as if fully set forth herein. However, most actions can be performed using the keys on the control panel of the projector.

Navigating and entering commands, with the remote control device may be accomplished with relatively few keys. The mouse disk and the Forward/Reverse keys. To select a button, checkbox, list box, or any item in a list box, the mouse disc is rotated to highlight the item. Once in a list box, Forward and Reverse are pressed to select an item. To click a button or check a checkbox (once selected), the mouse disc is pressed.

The light activated control device may be used to select items in the dialog boxes according to the following steps:

1. point to the button, checkbox, or file; and
2. press and release the button on the wand or activate the high-intensity laser pointer.

The system 10 can be sued to customize a presentation with a Presentation Selector dialog box to change directories and copy files.

Upon activation of the system 10, the title screen appears. Depressing the Prog 2 key on the remote control device activates the Presentation Selector. (Or, with the light activated control device the Presentation Selector is selected by depressing the button on the wand or activating the high-intensity laser spot.)

All of the dialog boxes are organized in a similar way; action buttons are found on the right, and hint messages appear near the bottom. These hints briefly describe the current time or action.

Figure 3:
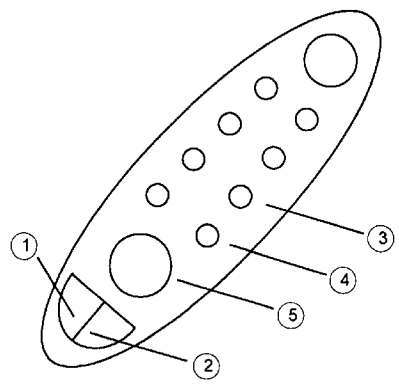
FIG. 3 is a diagrammatical view of mouse control device for use with the arrangement of FIG. 1.

FIG. 3 shows the Presentation Selector for the system 10 which includes a hard disk. For other systems (not shown) which include a floppy disk but no hard disk, the Presentation Selector will not have the Hard Disk list box or the Copy button.

The Floppy Disk list box shows the files on the floppy disk in the disk drive. Directories are followed by a backslash (\) after the name (such as the directory TEMP\ shown in FIG. 3). To scroll the list, one of the arrows on the scroll bar is selected and clicked on.

The Show Only PDF Files checkbox enables the viewing of all the files on the disk or only presentation files.

The current directory path appears just above each list box. In FIG. 3, the files in the Hard Disk list box are in the KICKOFF directory. To move up one directory level, the ..\ string is double clicked.

The Hard Disk list box indicates the files stored on the hard disk (if a hard disk is coupled to the system 10).

The Presentation Selector may be used to copy files between a floppy disk and the optional Media Express hard disk, choose a presentation to run, choose a presentation to edit, and delete a presentation file from disk.

A different directory may be selected by double-clicking on the name of the desired directory. Alternatively, the desired directory may be selected and the Goto button clicked on. The path, including the directory, will appear at the top of the list box. To move up to the parent directory, the ..\ string in the list box may be double-clicked.

For the system 10 having a hard disk, a file or directory may be copied onto the hard disk by initially placing the floppy disk into the disk drive.

The Floppy Disk file list in the Presentation Selector is then selected before selecting the file or directory that is to be copied. After selecting the file or directory to be copied, the arrow on the Copy button will point down to indicate that desired file or directory will be copied from the floppy disk to the hard disk.

Prior to copying the file or directory, the current hard disk directory should be confirmed as the desired hard disk directory to receive the file or directory. The Copy button should then be selected. If a directory is being copied, or an existing file is being replaced, the selection must be confirmed by clicking OK.

When the system 12 has finished copying the file or directory, the name of the file or directory will appear in the Hard Disk file list. If a file or directory with the same name already exists, a prompt to overwrite the existing file or directory will appear.

To delete a file or directory, it should be selected and the Delete button clicked. If a directory containing files is being deleted, the system 10 will confirm that the directory and associated files are to be deleted.

The Slide Sorter (FIG. 4) may be used to rearrange slides and to set slide transitions and timing. The following steps enable the selection of the presentation file and switch to the Slide Sorter dialog box: in the Presentation Selector, the desired PDF file is selected; and the Modify button is clicked on.

Figure 4:
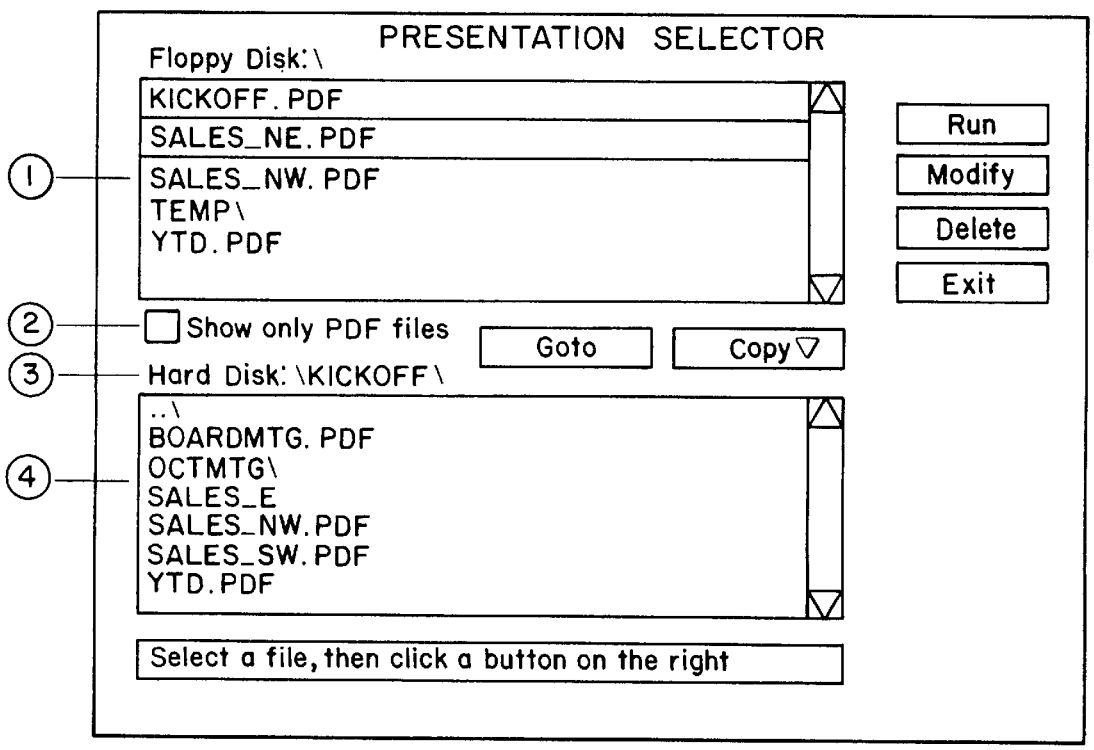
FIG. 4 is a pictorial view of a Presentation Selector screen utilized by the arrangement of FIG. 1.

As shown in FIG. 4, the Slide list box of the Slide Sorter shows the slides in sequential order. To scroll the Slide list box, the arrows in the scroll bar or between the arrows may be clicked on. The current slide has a blue background in the label. To select a different slide, the mouse disc is rotated to point to the slide, then the mouse disc is pressed (or press the Forward or Reverse key).

The four arrow buttons facilitate quick movement between the slides. In this regard, moving between the first, previous, next, and last slides, respectively, is enabled.

Two buttons, Select All and Deselect All, enable the entire slideshow to be operated on. These buttons help assign common transitions or timing to all slides.

Multiple Select Mode permits the selection of individual slides, or the selection of several slides as a group. This function is helpful when the modification or movement of several slides at once is desired. The Multiple Select Mode is automatically turned off when Deselect All is clicked on. The action buttons on the right of the screen facilitate the customization of the presentation.

The Close-up window shows an enlarged version of the current slide Double-clicking on this window display the slideshow. This window also shows each slide's transition effect between adjacent slides in the list box.

Choosing one of the four action buttons in the lower group (Transition, Hide, View, or Move) causes the chosen operation to be carried out on either the current slide or on a group of slides that was selected.

The selection of slides may be accomplished with the remote control device as follows. To select a single slide, the mouse disk is rotated to point to the slide, then the mouse disc is pressed. Alternately, Forward or Reverse may be pressed until the slide is reached.

To select several slides, Multiple Select Model should be enabled before rotating the mouse disc to each slide and pressing the mouse disc. If dragging several slides at once is preferred, the pointer may be moved above the first slide in the group, the mouse disc pressed for 2 seconds, then dragging a selection box around all of the desired slides.

The current slide has a blue background in the label. To select a different slide, the cursor is moved the mouse disc is pressed or with the light activated control device, point to the slide and press the button on the wand or activate the high-intensity laser spot).

To select multiple slides for moving or modifying them as a group, the Multiple Select Mode is turned on, then each slide is selected, one at a time (rotate the mouse disc to reach a slide, then press the mouse disc). Selected slides are surrounded by a blue outline. If a slide is selected by mistake, it may be selected again to "deselect" it.

To drag select consecutive slides, drag a selection box around the slides you want, starting just before the first slide. When the selection box is released, a blue outline appears around the group. After completing the selection of consecutive slides, the Multiple Select Mode should be turned off. Using the light activated control device, the selection of the slides is accomplished utilizing a click and drag function as with a mouse.

Dragging with the remote control device is accomplished according to the following steps: the mouse pointer is moved above and to the left of the first slide that is to be selected; the mouse disc is pressed for a moment, then released; the mouse disc is rotated to move the last slide to be selected. As the cursor is dragged, the box enclosing the selected slides is expanded; and the mouse disc is then released to define the group. The slides are thereby selected (they all show a blue outline around them), and the system 10 switches to Multiple Select mode.

It should be noted that selected slides have a blue outline around them. This is different from the current slide, which has a blue label. A slide can be selected yet not be the current slide.

The moving of slides is accomplished using either the remote control device or the light activated control device. However, only slides within the current presentation file may be moved.

The movement of a slide or a group of slides with the remote control device is accomplished according to the following steps: select the slide (or slides) in the slide list box that are to be moved; the Move button is clicked on in the Slide Sorter; the mouse disc is rotated to indicate the desired location. An insertion bar (a solid vertical bar between slides) shows where the slides would be placed. To scroll, the cursor is moved above or below the list box. A scroll bar cannot be clicked on while dragging a slide; when the insertion bar is in the right position, the mouse disc is pressed once quickly to place the slide or slides; and the Save button is clicked on to save the changes.

After a move, the system 10 automatically renumbers the slides in sequential order and turns off the Multiple Select mode if it was previously turned on.

Instead of moving slides, they can be dragged to a new position. To drag a slide or slides with the remote control device, the following steps are performed: the slide or group of slides is selected; the cursor is moved to the slide's label for the label of one of the selected slides, and the mouse disc is pressed for a moment, then released. The mouse pointer will then change to an arrow with a page. The label and not the slide, must be dragged; the mouse disc is rotated to move the slide or slides. An insertion bar (a vertical bar between slides) indicates where the slides will be placed. To scroll, the cursor is moved above or below the list box. A scroll bar cannot be clicked on while dragging a slide; when the slides are in the desired location, the mouse disc is pressed once quickly; and the Save button is then clicked to save these changes.

To drag one or more slides with the light activated control device, only one of the labels is dragged. To drop the slide(s) into place, the button on the wand is released or the high-intensity laser spot is deactivated. To scroll the list box while dragging slides, the cursor is moved above or below the list box. The scroll bar cannot be clicked on while dragging a slide.

Figure 5:
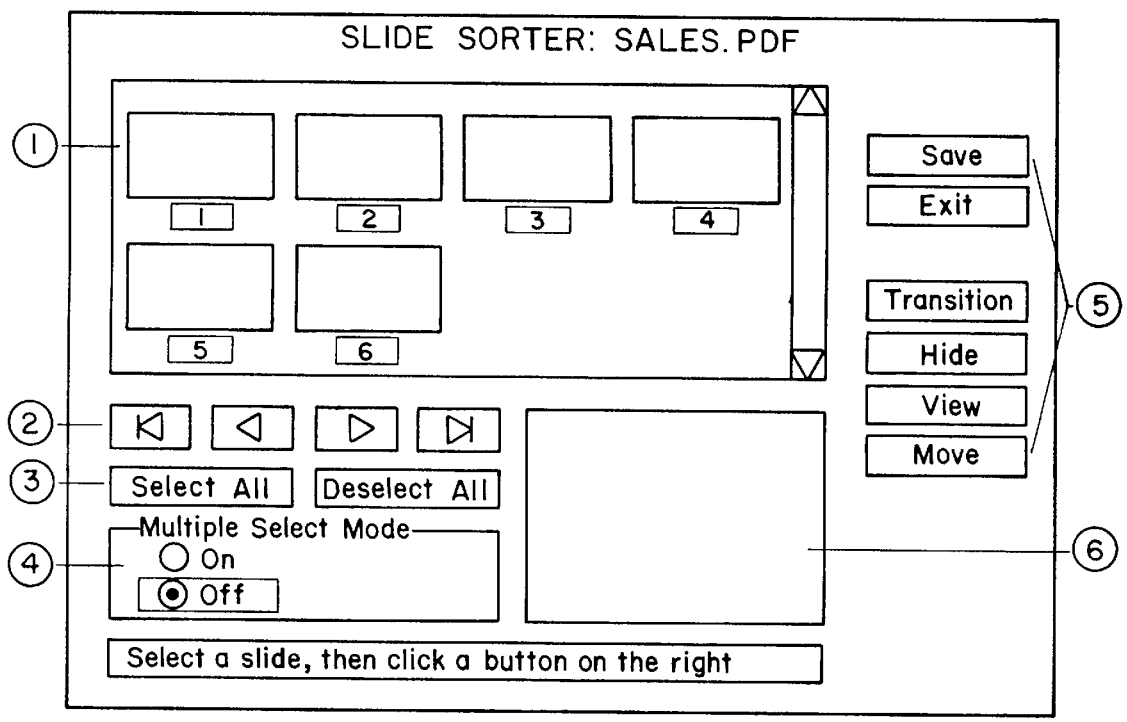
FIG. 5 is a pictorial view of a Slide Sorter screen utilized by the arrangement of FIG. 1.

Slides may be hidden so that they do not appear during the presentation. Slides can be hidden and unhidden one at a time, or as a group, as follows: in the slide list box the slide (or slides) to be hidden are selected; the Hide button in the Slide Sorter is clicked on; the slide still appears in the slide list box, but with a large "X" through it (FIG. 5); and the Save button is clicked on to save the changes.

To unhide a hidden slide, the hidden slide is selected and the Hide button is then clicked on.

When working with a group of selected slides, the results of clicking the Hide button depend on the condition of the first selected slide. If the first selected slide is hidden, clicking the Hide button will unhide all of them. If the first slide is unhidden, clicking Hide will hide all of them.

The system 10 may also be used to add transition effects and timing to a presentation. Transitions are special effects that determine how a slide appears on the screen. If transition effects are assigned through application software, such as Freelance or PowerPoint, those transitions are not recognized by the system 10 and will not be displayed thereby. There are, however, many transitions available using the system 10, including the following:

TABLE I

| Effect Name | Result |
| --- | --- |
| Random | Assigns transitions to each slide at random. |
| Blinds vertical, horizontal | Open slats onto the screen. |
| Box in, out | Open the screen to or from the center. |
| Dissolve | Dissolves the slide. |
| Glitter right, down, across | Wipe the screen from one side to the other, with sparkling effects. |
| Split horizontal in, out; Split vertical in, out | Peel the screen to or from the middle. |
| Wipe left, right, up and down | Wipe the screen from one side to the other. |

The transition designated for the current slide may be identified by looking at the Close-up window. To set or change a slide transition, the Transition Selector must be selected as follows: select the slide or slides to be changed in the slide list box; and the Transition button in the Slide Sorter is then clicked on.

Figure 6:
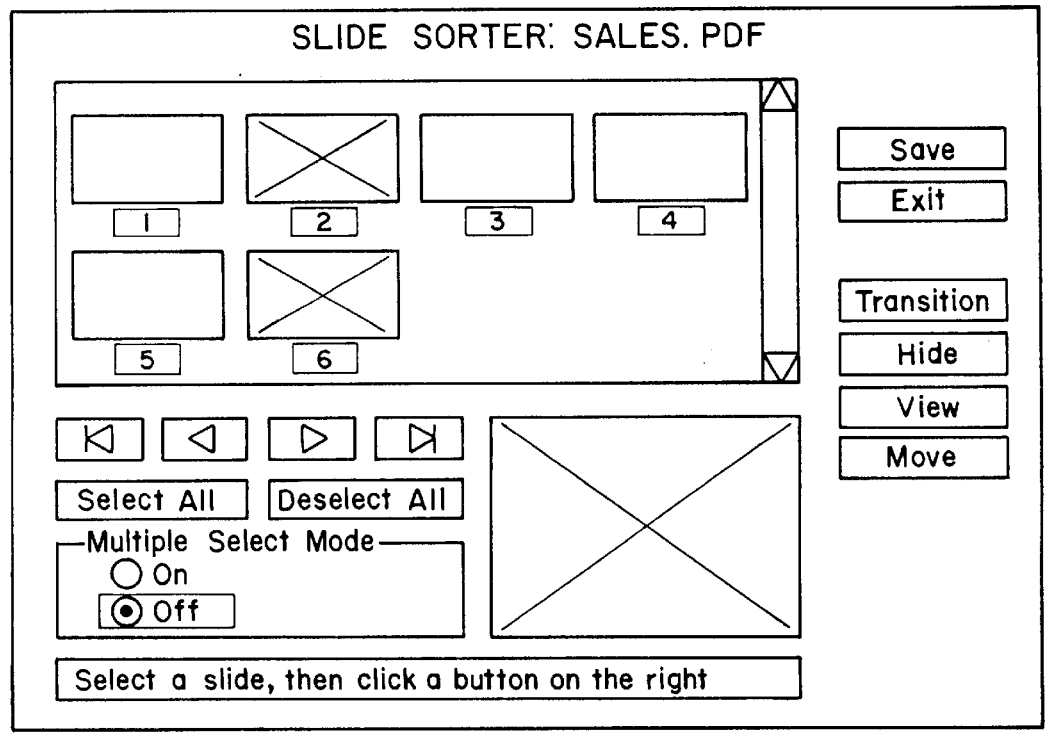
FIG. 6 is a pictorial view of the Slide Sorter screen of FIG. 5 illustrating the selection of slides to be manipulated.
Figure 7:
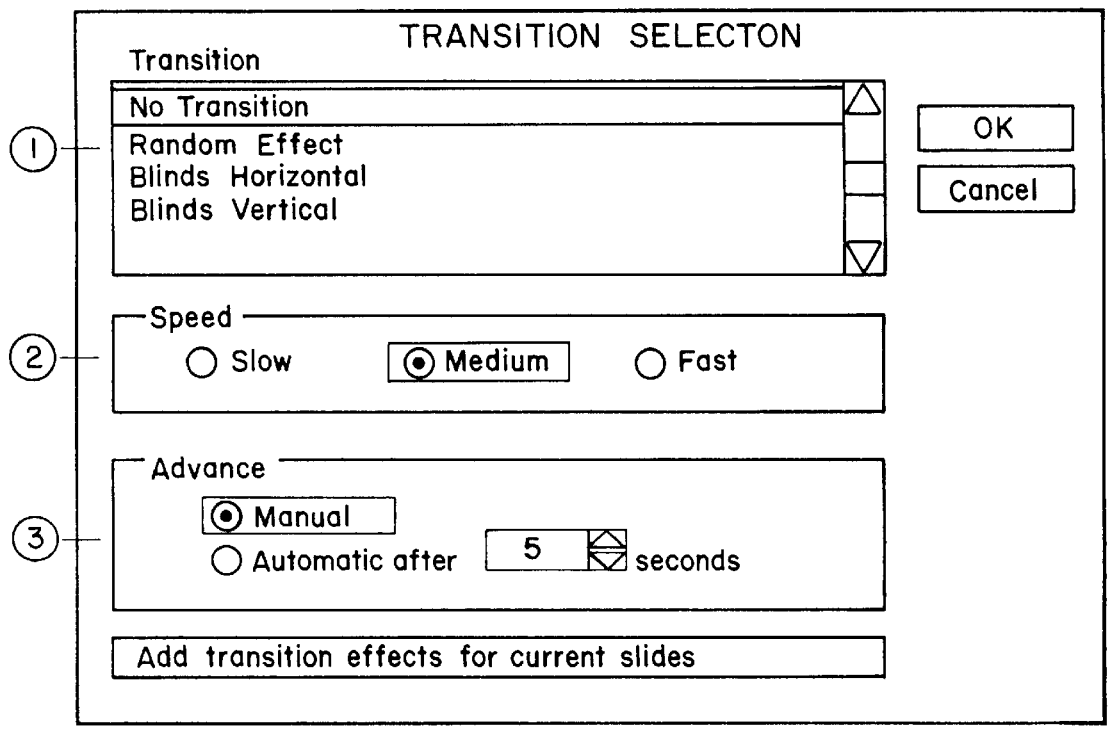
FIG. 7 is a pictorial view of a Transition Selector screen utilized by the arrangement of FIG. 1.

The Transition Selector is shown in FIG. 6, and facilitates the assignment of transition effects to slides, and also determines how and when the presentation advances to the next slide. These settings determine how the slide arrives on the screen, but not how it leaves the screen.

The Transition list box shows all of the transition effects available, including No Transition (which replaces one slide with another with no visual effect) and Random Effect (which applies transition effects to slides at random).

The Speed setting determines how quickly the slide arrives onscreen, but not how long it remains on the screen. Slow corresponds to about 2 seconds, Medium 1 second, and Fast less than 1 second.

The Advance setting controls whether the slide advances automatically or manually. If Automatic is chosen, the time that the slide remains on the screen before the presentation advances to the next slide must be selected.

Transitions may be adjusted by: selecting the transition effect, speed, and advancement settings; clicking on OK in the Transition Selector when the desired settings have been selected; and returning to the Slide Sorter and clicking Save to save the changes.

Initially, the options in the Transition Selector dialog box have the following settings: Transition is set to No; Transition, Speed is set to Medium; and Advance is set to Manual.

If multiple slides having different settings are selected, the last settings specified will remain as the default.

The presentation may be started from the Transition Selector dialog box to check the changes. By selecting the slide or slides to be viewed, and subsequently clicking in the View button in the Slide Sorter, or double-clicking on the Close-up window, the presentation is started.

The Presentation Options dialog box then appears, with the current slide, or the first selected slide, as the "from)" slide, and the last slide in the file, or the last selected slide as the "to" slide.

It is recommended that the presentation start the Presentation Selector.

After the presentation has been customized, the Save in the Slide Sorter should be clicked on to save the changes before exiting this dialog box. If Exit is chosen before recent changes are saved, a prompt to save those changes is displayed.

The previous discussion describes the steps involved in preparing a presentation. Once the presentation has been prepared including the customization thereof, the presentation is ready to be displayed by the system 10. To display the presentation, the following steps are utilized: the projection is turned on and Prog 2 key is pressed. A title screen will then appear; the Prog 2 key is pressed again to clear the title screen. The Presentation Selector dialog box appears; and the PDF file is then double-clicked on to display Presentation Options dialog box. Alternatively, the name of the file may be selected and the Run button clicked on.

The Presentation Options dialog box offers several settings that affect how the presentation runs. These settings are not saved with the presentation file; they must be set when you tart a presentation.

The Show Slides setting permits the entire presentation, or a sequential part of it, to be run. To run a part of the presentation, the numbers of the first and last slides in the sequence must be indicated.

The Advance setting permits the selection of the slides to be manually advanced from slide to slide. Choose Enable automatic advance, each slide will advance according to the timing indicated for it in the Advance section of the Transition Selector dialog box.

The Loop continuously setting permits the presentation to be displayed over and over until the display is stopped manually.

The Show presentation toolbar setting toolbar the use of a during presentation. The Toolbar, as will be described hereinafter in greater detail, has buttons to advance or refers through slides. It also offers a Preview window, which can be used to skip or preview slides on a monitor without distracting the audience.

The settings chosen in the Presentation Options dialog box will remain in effect until the projector is turned off. After the projector has been turned off, the settings revert to the defaults.

Figures 8, 9:
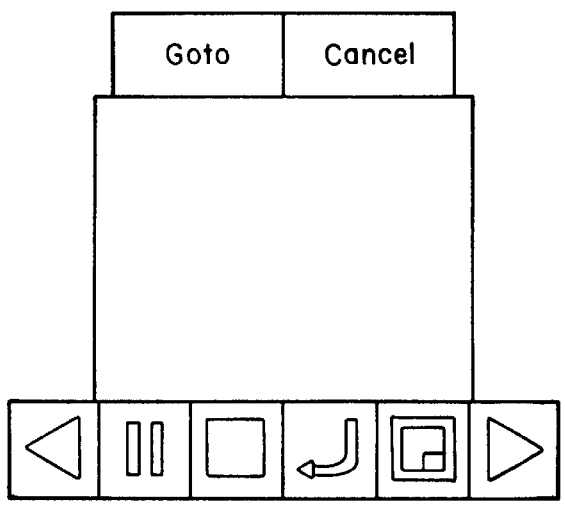
FIG. 8 is a pictorial view of a Presentation Options screen utilized by the arrangement of FIG. 1.
FIG. 9 is a pictorial view of the Tool Bar menu utilized by the arrangement of FIG. 1.

Considering now the Toolbar utility software in greater detail with reference to FIG. 8, the Toolbar utility has two main functions: The toolbar facilitates running presentations with a wand or laser pointer associated with the light activated control device by offering the same features as the remote control device; and the toolbar permits the use of a private Preview window, where the next slide can be previewed, or a slide can be located on a monitor without distracting the audience.

To display a toolbar, the Show presentation toolbar is selected in the Presentation Options dialog box. The toolbar appears near the bottom right corner o the screen. Its buttons are similar to those found on most VCRs and laserdisc players.

The Toolbar buttons perform the following functions:
Previous returns to the previous slide;
Pause suspends the timer if the slide is set to automatically advance. Click this button a second time to resume the advance timer;
Stop ends the presentation;
Return brings the slide back to normal magnification (if the slide was previously zoomed). Or, if a hot link was selected, this button returns from the link;
Preview displays a small window in the lower right corner of the monitor that can be used to view or find any slide in the presentation; and Next advances to the next slide.

The Preview window can be used when it is desired to privately preview the next slide, or to search for another slide.

To use the Preview window, the Preview button on the Toolbar is clicked on. A small window appears above the Toolbar on the monitor.

While the Preview window is visible, all cations performed only affect the display on the monitor. For example, if the Next button is clicked on, the monitor will show the next slide, but the projected image will not change. When it is desired to show the slide displayed on the monitor, the Goto button above the Preview window is clicked on.

For example, to skip over several slides, follow these steps: Click the Preview button on the Toolbar to turn on Preview mode. The Preview window appears on the monitor, showing the next slide. The projected image (the one the audience sees) is frozen; click the Next button on the Toolbar to skip slides until the monitor shows the desired slide; and click the Goto button above the Preview window. The audience will see the same slide that is displayed on the monitor.

When it is desired to close the Preview window, click the Cancel button above it.

TO zoom in on part of a slide, a box is dragged around that area of the slide. The zoom function can then be activated as often as desired. Press the Pause/Return key once to return the slide to normal magnification (or click the Return button on the Toolbar).

If the slide is set to automatically advance, the Return button in the Toolbar must be clicked on to return to normal magnification—pressing the Pause button will only suspend the slide's timer.

Some application programs let you add "hot" buttons-buttons that jump to specific (usually related) slides within the same file. The system 10 supports these hot links.

If the presentation includes hot links, simply clicking on the hot links enables a jump to the designated screen. To return from a jump, press the Pause key (or click the Return button in the Toolbar). IF the slide is set to automatically advance, the Return button on the Toolbar must be clicked on. Pressing the Pause button will just suspend the slide's timer.

USER INTERFACE

Several terms will be used throughout the description of the user interface and are described below:

Control: noun describing a user interface element which allows the user to perform some action or make some selection. A button is an example of a control.

Input focus: a control is said to have the input focus when the next key pressed performs relative to that control (not including the mouse keys). The input focus is generally only important when navigation is done via the keypad rather than the mouse. Hitting the select key while a button has the input focus selects that button.

Selection: a control is selected when a key is pressed to perform the action associated with the control. When a button is selected, the specified action is performed.

Autowrap: when navigating a list or group of items, autowrap indicates that the selection or input focus will move from the last item to the first item when a "forward" key is hit, and will move from the first to last item when a "reverse" key is hit.

System modal: a dialog box is system modal if input can only be made within the dialog box; user input outside of the dialog is not processed.

Location/Selection Controls

In order for user input to be captured and sent to the system 10 processor, the user must be provided with a means for navigating the interface and selecting various options. Devices which will be able to navigate the system 10 screens are the remote, keypad, and light activated control device.

Remote

The most intuitive and user-friendly selection/location device is the remote. The remote on Platypus provides the following keys to be used with system 10:

Mouse disk: utilized for movement of the cursor throughout the projected display Mouse disk button: used for cursor selection over the current position Fwd (+): used to move the selection "forward" within a contiguous logical group of items Rev (−): used to move the selection "backward" within a contiguous logical group of items System 10/Prog. 2: utilized for a variety of purposes explained later in this document Pause/Return: used to freeze a slide show which contains automatic advancing, or to return from a link or zoom if automatic advance is not set for a slide The user will have the ability to utilize the keypad for navigation and selection within the system 10 interface. Note that the use of the keypad is much less natural than the remote, and is only advised for circumstances when the remote is not available. The four arrow keys on the keypad as well as the system 10 button will be used to provide the capability for a user to work with system 10. The general behavior of these keys will be:

left/right arrows: navigate between controls and groups of controls (buttons, list boxes. . . . )

up/down arrows: navigate within controls (within list boxes, move sliders. . . . )

System 10 button: utilized for various purposes described later in this user interface description The definition of the behavior of these keys in system 10 mode must conform with the behavior of these keys within the projector menus, as well as provide additional behavior for more control items within system 10. This behavior will be described in more detail for each interface.

Light activated control device provides mouse movement (the wand device) and mouse selection (left, right, or center button). No forward, reverse, or selector mechanisms are defined for light activated control device hardware. The mouse movement and selection behavior are the same as that for the remote.

Basic Control Elements

Buttons will be used in the system 10 user interface to represent actions which a user can take. The text and border will generally be black. When an action is not able to be performed for a given user selection or mode, the button will be disabled, and the text will become gray. When a button has the input focus, the border will become blue. A button is selected by 1) navigating the mouse with the remote to the button and hitting the mouse selection key; or 2) hitting the system 10 selection key from the keypad or remote while the button has the input focus. Selection of the button will cause the specified action to be performed.

A list box contains textual or iconic items which can be selected. Only one item can be selected at any time for list boxes in system 10, except for the Slide Sorter list box. If an item is selected, the previously selected item becomes deselected., Selection occurs when 1) the user moves the mouse over an item and hits the mouse selection key; 2) the user hits the forward or reverse keys on the remote; 3) the user hits the up/down keys on the keypad while the list box has the input focus. The input focus is indicated by a blue rectangle surrounding the control. When navigating with the forward/reverse keys or up/down keys, each key press moves the selected item up/down by one item. Note that the forward/reverse keys work differently than the up/down keys in configurations with a hard disk. If the first or last item is selected, the next key press wraps around to the last or first item. If no item was selected and the forward/reverse key is pressed, the first/last item is selected. When forward or reverse selects a filename outside of the current view, the list will scroll to the newly selected filename. Items in the list appear in black text over a white or gray background. Deselection of an item occurs when the mouse selection is made on another item (which then selects that item and deselects the current one). When an item is selected, the text for the item becomes white and the background for the row becomes black. When the list has the input focus, its border becomes blue.

A scroll bar appears with the list box. If all items are within the current view, the thumb (rectangle in scroll bar) is not visible. When items scroll beyond the list, the thumb is visible and indicates the relative position within the list. To navigate using the scroll bar, the user must use the mouse to locate the cursor over the arrow buttons. Hitting the mouse selection key over these arrow buttons scrolls the list up or down by one item. The scroll bar thumb can also be dragged to a desired list location.

When the portion of the scroll bar between the thumb and the arrows is clicked, the list scrolls by one page.

Radio buttons in system 10 are used for mutually exclusive choices. Only one button can be selected within a group of radio buttons. The text will generally be black with a single-line black border around the selected item. When a group of radio buttons has the input focus, the border will become blue. A button is selected by 1) navigating the mouse with the remote to the button and hitting the mouse selection key; or 2) hitting the up/down arrow keys from the keypad while the radio button group has the input focus. Selection of the button will cause the previously selected button within the group to be deselected. Some button within a radio control will always be selected. Selection is indicated by the filled circle next to the text for the option. Unselected items have hollow circle indicators.

Checkboxes are used to toggle on or off a particular setting. The text and border will generally be black. When a checkmark has the input focus, the border will become blue . A checkmark is selected by 1) navigating the mouse with the remote to the button and hitting the mouse selection key; or 2) hitting the system 10 select key from the keypad or remote while the checkmark has the input focus. Selection of the checkmark will cause an "x" to be shown in the indicator box. Deselection will remove the "x".

The cursor is a representation of the current mouse position on the screen. In system 10, the standard arrow cursor will be used. When the system is busy, a watch cursor will be displayed. When the user chooses to move slides, the cursor will change to a moving document indicating the move mode. An out-of-bounds cursor also exists to indicate invalid areas during move mode. When the user is in slide show mode, the cursor changes to a pointing hand when over a hot link.

The system 10 system has 3 basic dialog boxes which it shows at various times with different messages. These are the status dialog, the message dialog, and the question dialog, Specific usage of these dialogs will be described in later sections.

The status dialog will be used to display messages to the user when the system 10 system is busy. This includes operations like copying files and drawing the first page of a slide show. The dialog includes text only and has no controls. The dialog box is system modal: any user input via the remote or keypad will not be processed while the dialog is displayed. When the system is no longer busy with the specified operation, the dialog box will be removed from the display.

The message dialog in system 10 will be used to display information to a user which requires user acknowledgment. All message dialogs in system 10 only have one control, an "OK" button, which will have the input focus when displayed. The message dialog is system modal. Selection of the "OK" button removes the dialog from the display. All error messages will be presented in message dialogs.

The question dialog prompts the user with a question and remains displayed until an answer button is chosen. Question dialogs in system 10 will have either 2 or 3 answer buttons. A default button will have the initial input focus, and will usually be the action requested ("Delete", for example). Navigation with the keypad interface will be provided via the left/right arrow keys. These will move the input focus left or right within the answer buttons; autowrap navigation will be supported. The question dialog box is system modal. When an answer button is selected, the dialog will be removed from the display.

The title screen will initially be displayed after the system 10 system has been powered on successfully. Power-on failure occurs if the startup diagnostics fail or the system 10 protocol between the projector and system 10 results in an error. In these cases, hardware failure will prevent a title screen or error message from being displayed on the projected screen: the projector will be notified of the error. When power-on is successful, the title screen will be shown and will include the system 10 copyright and the Adobe copyright. The title screen will be a new graphic in PDF format.

Upon initial successful power-on, the title screen will be displayed. The title screen will also be displayed when system 10 is in an "idle" state (no slide show selected, no interface displayed). In this mode, hitting the system 10 selection key (remote or keypad) will display the presentation selector. Other keys will also bring up the presentation selector: the forward/reverse keys, or the mouse disk button.

The presentation selector interface allows the user to work with a presentation file. The appearance of the presentation selector is based on the system 10 configuration: systems containing only a floppy drive display the "floppy drive only" interface; systems containing a hard drive and floppy drive display the "hard drive and floppy drive" interface.

The presentation selector for system 10 systems without a hard drive is shown above. When initially displayed, files on the floppy with a pdf extension are shown in the list box (name.pdf, name1.pdf. . . . ) When the presentation selector is displayed at initial startup, the first file name is selected. When a file is selected, that file will remain selected until the exit button is chosen. If the floppy disk changes while the presentation selector is displayed, the change will be picked up when the list selection changes or when a button is selected. The initial input focus will be on the "run" button. The navigation sequence from the keypad (right arrow button) moves the user clockwise through the controls: modify button, delete button, exit button, "show only PDF files" option, goto button, list box, and back to the run button. The left arrow button on the keypad will navigate in reverse order. If any control is disabled, it will be skipped in the navigation order.

Filename List Box. Only files ending in ".pdf" will be initially be displayed in the filename list box. The filename list box is a standard system 10 list box. Double clicking on a file will cause that file to be selected and a presentation started (see RUN button below). Double clicking on a directory will cause that directory to be selected and will change the list box contents to the contents of that directory (see GOTO button below). Hitting the system 10 button when a file or directory is selected has the same effect as double clicking described above.

Show only PDF files checkmark: This indicates whether all files on the floppy should be shown. When turned on, only PDF files are listed, as well as directories. When turned off, all files and directories are shown. Directories are listed with a "\" at the end of the name; while in a subdirectory, the parent directory is noted with ".. \".

RUN button: The RUN button will be enabled when a file is selected and dimmed when a directory is selected. Selection of the RUN button starts a presentation using the currently selected filename. Initially, the "Presentation Options" dialog is presented, followed by the presentation. Selecting RUN on a non-PDF formatted file will result in an error message dialog.

MODIFY button: The MODIFY button will be enabled when a file is selected and dimmed when a directory is selected. Selection of the MODIFY button causes the slide sorter interface to be displayed, with the currently selected file being edited. If the currently selected file is not editable, an error message dialog is displayed: "File cannot be edited." Selecting MODIFY on a non-PDF formatted file will result in an error message dialog: "File is not a valid PDF file".

DELETE button: The DELETE button will be enabled when a file is selected and dimmed when no file is selected. Selection of the DELETE button causes the following question dialog to be displayed: "Are you sure you want to delete <filename>?" with answers "Delete" and "Cancel". If the selection is a directory, the following confirmation is displayed: "Are you sure you want to delete directory <name> and its contents?" "Cancel" will have the initial input focus. A selection of "Delete" causes the currently selected file or directory to be deleted. Selection of "Cancel" cancels the delete operation. While a deletion is occurring, the status message "Deleting <name>" is displayed.

EXIT button: The EXIT button will be enabled at all times. Selection of the EXIT button removes the presentation selector interface from the display. The display will return to the title screen.

GOTO button: The GOTO button will be enabled only when a directory is currently selected. Selection of the GOTO button will change the contents of the file list box to the selected directory contents. Selection of ".. \" will change to the parent directory of the current directory. The current directory is shown at the top of the file list box.

Help Text: The bottom text field lists single-line help messages. The user has no control over the contents of this text box. These messages change based on: 1) mouse movements—displaying help for the control under the current mouse position; and 2) keypad traversals—when a new control has the input focus after a left/right keypad button press, the help text changes for the current control.

The presentation selector for system 10 systems with a hard drive is shown above. When initially displayed, files on either disk with a pdf extension are shown in the list boxes (name.pdf, name1.pdf. . . . ) When the presentation selector is displayed at initial startup, the first file name on the floppy is selected; if no files exist on the floppy, the first file on the hard drive is selected. After a user selects a file, that file continues to be selected until the exit button is selected. The "run" button will have the initial input focus: navigation will proceed in a clockwise manner when using the right arrow button on the keypad: modify button, delete button, exit button, hard drive list box, the "show only PDF files" checkmark, "goto" button, "copy" button, floppy list box, and back to the run button. The left arrow button on the keypad will navigate in reverse order. If any control is disabled, it will be skipped during the navigation.

The behavior of the presentation selector with hard drive and floppy is the same as the selector without the hard drive except for the additional controls listed below:

Floppy drive/hard drive filename list boxes: These lists behave as if they@ were a single list, since the user can only select a single file at any given time. The behavior is similar to the standard system 10 list box with a few differences regarding the operation of "forward" and "reverse" on the remote:

"Reverse" steps the selection to the filename above the current filename (logically backward). If the first filename in the floppy list was selected, the selection wraps around to the last filename of the hard drive list; if the first filename in the hard drive list was selected, the selection wraps around to the last filename of the floppy drive list.

"Forward" steps the selection to the filename below the current filename (logically forward). If the last filename of the floppy drive was selected, the selection wraps around to the first filename of the hard drive; if the last filename of the hard drive was selected, the selection wraps around to the first filename on the floppy.

Also, the file selection mechanism is as follows: if no floppy is inserted, a file on the hard drive will always be selected. When the user clicks on the floppy drive, the current control becomes the floppy drive, but the file on the hard drive remains selected.

Copy button: The COPY button will be enabled when a file in the hard drive or floppy filename list is selected and dimmed when no files exist in either list. This button will also be dimmed if there is no floppy disk inserted in the floppy drive. An arrow icon after the word "copy" indicates the direction the copy will go: an "up" arrow indicates a copy from the selected file on the hard drive to the floppy; a "down" arrow indicates a copy from the selected file on the floppy to the hard drive. This arrow will change based on the currently selected file: when the currently selected file is on the floppy, a "down" arrow will be displayed; when the currently selected file is on the hard drive, an "up" arrow will be displayed.

Selection of the COPY button copies the selected file to the floppy or hard disk. If the COPY button is selected and the same filename already exists on the destination disk, the following question dialog will be displayed: "<filename> already exists on the <hard or floppy> drive. Overwrite?" with answers "Overwrite" and "Cancel." When "Overwrite" is selected, the filename will be replaced on the destination disk. If "Cancel" is selected no copy will occur. If the current selection is a directory, the message "Copy directory <name> and its contents?" will be displayed before a copy with answers "Copy" and "Cancel": "Copy" will perform the copy, "Cancel" will abort the copy. During a copy operation, the message "copying <name> . . . ." will be displayed.

The slide sorter allows the user to modify a specific presentation file and save it to disk. This interface is displayed when the user selects the modify button on the presentation selector. The presentation file being edited is displayed after the title when the slide sorter is displayed. When initially presented, the first slide is selected, the slide preview window displays the selected slide, and the initial multiple selection mode is "off". The "exit" button has the initial input focus. Navigation occurs in the following clockwise order when the right arrow button on the keypad is hit: transition button, hide button, view button, multiple select group, select all button, deselect all button, first button, previous button, next button, last button, slide list box, save button, and back to the exit button. The left arrow navigates in counter-clockwise order. If any control is disabled, it will be skipped in the navigation order. Note that the move button is skipped in the navigation order: move would be too cumbersome for a user if performed via the keypad, and can only be performed using the mouse controls.

Slide List Box: The slide list box displays all the slides in the current presentation file. Slides are presented in a row/column format, with consecutive slides displayed along the same row, then wrapping around to the next row. Slide selection is done via the mouse selection key. Selection is indicated by a blue background in the slide label. Selection behavior is dependent on the state of the multiple select mode button. When "off", selection will be in single selection mode: selecting a single slide will deselect the previously selected slide. When the multiple select mode button is "on", selecting a single slide will not deselect the previously selected slide: the newly selected slide will be added to the current selections. Current selections in multiple select mode are indicated by a blue outline around each selection; however, the last selection made by clicking the mouse is indicated with a blue label as described above. This is important for navigation with the forward/reverse keys, since some notion of the "current" slide must be used as a reference point. Pressing the mouse selection key on any currently selected slide in this mode will deselect that slide.

Slide selection can also be done via the keypad (up/down arrows when the list box has the input focus) and remote (forward/reverse keys) which behave identically. The forward/reverse keys select the next/previous slide from the currently selected slide. For single select mode, the previously selected slide is deselected; for multiple select mode, the previously selected slide remains selected. The list box supports autowrap behavior. When the forward/reverse key press selects a slide currently out of view, the view is scrolled to the newly selected slide. The scroll bar behaves identically to that described for the general system 10 list box. Note that during multiple select mode, selection via the up/down keys and the forward/reverse keys never deselects a previously selected slide: if a currently selected slide is selected via these keys, it is not deselected (as it is for mouse selection). Deselection can occur by pressing the system 10 button: this will toggle the selection state of the current slide during multiple select mode.

Multiple Select Mode: The multiple select mode buttons affect the slide list box selection mechanism. One of these buttons will always be selected; initially the "off" button will always be selected, regardless of the state of this button when this interface was last displayed. Note that multiple selection of slides can also occur by dragging a rectangle around a set of slides: this automatically changes the multiple select mode to "on" and selects the slides within the rectangle.

"Select All"/"Deselect All" Button: Selection of these buttons allows the user to select/deselect all slides within the current presentation. This is independent of the current state of the multiple select mode. When "Select all" is chosen, the multiple select mode is changed to "on". When "Deselect all" is chosen, the multiple select mode is changed to "off".

"First/Previous/Next/Last" Buttons: Selection of these buttons advances the current selection. First selects the first slide; previous selects the previous slide from the current selection; next selects the next slide from the current selection; and last selects the last slide.

Preview Window: The currently selected slide is blown up and shown in this window. The only user input defined for this window is a double click, which enters the view mode (see VIEW button below).

Help Text: The bottom text field lists single-line help messages. The user has no control over the contents of this text box. These messages change based on: 1) mouse movements—displaying help for the control under the current mouse position; and 2) keypad traversals—when a new control has the input focus after a left/right keypad button press, the help text changes for the current control.

SAVE button: The SAVE button will be enabled at all times. Selection of the SAVE button presents the message "Saving . . . ." until the save is complete.

EXIT button: The EXIT button will be enabled at all times. If no changes have been made to the file, selection of the EXIT button removes the slide sorter from the display, returning to the presentation selector. If any changes have been made, a question dialog is presented: "Do you want to save the current changes?" with answers "Save", "Don't Save", and "Cancel."

"Save" is the default selection. If "Save" is selected, the changes are saved to the presentation file and the slide sorter is removed from the display.

If "Don't Save" is selected, all changes made since the last "save" operation are lost and the slide sorter is removed from the display.

If "Cancel" is selected, the dialog is removed from the display and the slide sorter remains displayed.

TRANSITION button: The TRANSITION button allows the user to add transition effects for the currently selected slide(s). Selection of the TRANSITION button displays the transition selector dialog, described later in this document.

HIDE button: The HIDE button allows the user to selectively display or not display a single slide or multiple slides within the presentation. When the HIDE button is selected for a single slide, the behavior on the current slide is as follows: 1) If the slide is not currently hidden, the slide will be marked with a red x and will not appear during the presentation; 2) If the slide is currently hidden (and marked with a red x), the red x will be removed and the slide will appear during the presentation. When the HIDE button is selected for multiple slides, the behavior is as follows: 1) if any slide in the selected group is not hidden, all currently selected slides are hidden: a red x is marked on each slide and each will not appear during the presentation; 2) If all slides in the selected group are hidden, all currently selected slides are unhidden: all selected slides are not marked with a red x and all will appear during the presentation.

VIEW button: The VIEW button will always be enabled. The VIEW button previews the slide show being edited with the current attributes. This temporarily exits the slide sorter interface and transfers the user to slide show mode. All attributes applied in the slide sorter are applied to this view. This exhibits the same behavior as in a regular slide show. The "from/to" slide numbers are initialized as follows: in single select mode, the currently selected slide becomes the "from" slide, the last slide becomes the "to" slide; in multiple select mode, the first selected slide becomes the "from" slide, the last selected slide becomes the "to" slide. After a presentation is closed, control returns to the slide sorter dialog.

MOVE button: Selection of the MOVE button can only be accomplished with the mouse, since keypad operations while in move mode are not supported. The MOVE button allows the user to move a slide to a new location. After the MOVE button has been pressed, the cursor changes to a "move" icon (arrow with a document). The help text is changed to guide the user until a selection is made. An insertion bar also appears to indicate where the current slide would be moved to if the user clicked the mouse select button. If the user presses the mouse select button when the insertion bar is visible, the currently selected slide is moved to this insertion point. The slide list box is updated, the currently selected slide remains selected, the icon returns to the standard arrow icon, and the help text indicates that the move operation is complete. If the user presses the mouse select button on the currently selected slide while in move mode, no insertion bar is drawn and no move occurs. The icon returns to the standard arrow icon. The currently selected slide remains selected, and move mode is canceled. If the user selects anything while an out-of-bounds cursor is displayed in move mode, move mode is canceled as described above, and the help text is updated.

Multiple slides can also be moved. If in multiple select mode, the currently selected slides can be moved by pressing the move button, then selecting where to move the slide using the insertion bar as a visual cue. The same error checking occurs as described above. Slide movement can also occur by dragging a slide label and positioning it over the destination slide. Multiple slides can be moved by dragging one of the selected slides labels to a destination slide: all currently selected slides are moved after the drop point. Note that when moving multiple slides via the move button, the slides to be moved are outlined in blue rectangles; if the current slide (indicated by a blue colored label) is not selected (indicated by a blue rectangle outline), then it is not moved.

The transition selector dialog allows the user to add transition effects to the currently selected slide(s) in the slide sorter interface. Note that transition effects are displayed during a slide show when the display transitions to the slide with the transition effect. It is initiated by a user selection of the "transition" button on the slide sorter interface. When presented to the user, the selections will reflect whatever has been saved for the current slide. If no transition effects have been assigned to the current slide, the defaults will be "no transition", "medium" speed, and "manual" advance. For multiple slides with identical settings, these settings will be displayed. For multiple slides with different settings, no selection will be visible for those attributes which are different. This dialog is system modal, and the initial input focus in on the "OK" button. Navigation occurs in a clockwise manner with the right arrow button on the keypad: cancel button, "seconds" control, "advance" group, "speed" group, transition list, and back to "OK." The left arrow button on the keypad navigates in a counter-clockwise direction. Any disabled controls are skipped in the navigation sequence.

Transition Effects List: The transition effects list shows all available transition effects, and allows the user to select transition effects for the current slide(s). The list box behaves like a standard system 10 list box.

Speed Buttons: The speed options behave as described for the general system 10 radio buttons. They describe the speed of the current transition. Slow indicates a transition speed of about 2 seconds, medium indicates a speed of about 1 second, and fast indicates a speed of less than one second. Medium is the default speed.

Advance Controls: These options allow the user to select the mode of advancing to the next slide after the current slide(s). "Manual" indicates that the forward key must be selected by the user. "Automatic after" indicates that the slide will advance after the selected number of seconds automatically. These controls are always enabled, with "manual" as the default selection. The advance options behave like a standard system 10 radio button group.

The "seconds" control allows the user to specify the number of seconds between each slide during automatic advance. Mouse selection of the up arrow key increases the number of seconds, mouse selection of the down key decreases the number of seconds. When this control has the input focus, the keypad up/down arrows can also increase/decrease this value. The range of values available within this control are: 1–10, 12, 15,20, 30, 45, 60, 90, 120, 180, 240, 300.

Help Text: The bottom text field lists single-line help messages. The user has no control over the contents of this text box. These messages change based on: 1) mouse movements—displaying help for the control under the current mouse position; and 2) keypad traversals—when a new control has the input focus after a left/right keypad button press, the help text changes for the current control.

OK Button: Selection of this button saves the selected transition effects for the current slide(s). This button will always be enabled. The dialog is dismissed and control returns to the slide sorter.

CANCEL Button: Selection of this button cancels the transition effects dialog and returns control to the slide sorter dialog. This button will always be enabled.

The slide show options dialog allows the user to tailor the behavior of the ensuing slide show. This dialog is presented when the "run" button is selected from the presentation selector, or when the "view" button is selected from the slide sorter. The presentation file to be shown is listed after the "Presentation Options" title. The default values after power-on are: show all slides, manual advance, show presentation toolbar, and don't loop continuously. Subsequent displays indicate the last selection the user confirmed with the "OK" button. The input focus is initially on the "OK" button, and the dialog is system modal. Navigation occurs in a clockwise manner with the right arrow key on the keypad: cancel button, show presentation toolbar checkmark, loop continuously checkmark, advance group, show slides group, "from" slide number control, "to" slide number control, and back to OK. The left arrow button on the keypad navigates counter-clockwise. If any control is disabled, it is skipped in the navigation order.

Show slides radio group: These options allow the user to select the slides to be shown. The "all" selection shows all slides; the "from/to" selection only shows the slides between the numbers in the scrolling controls. These controls behave identically to the "automatic after" control in the transition dialog. The initial values are set to the first and last slides. The valid range of numbers in each is the total number of slides in the current file. Note that the "from" value can never exceed the current "to" value, and the "to" value can never be less than the current "from" value: this is checked in software.

Advance group: These options allow the user to override any individual transition effects for "automatic advance after n seconds" within the file (see transition dialog). If "manual" is selected, no automatic advancing will occur. If "enable automatic" is chosen, automatic transitions will be enabled for those slides which contain them.

Loop continuously: This checkmark control allows the user to turn on/off the autowrap capability within a slide show.

Show presentation toolbar: This checkmark control allows the user to display or hide a set of utility icons during a presentation. These icons are described in the next section "Slide Show Behavior". The default value for this control is "on" (display toolbar).

Help Text: The bottom text field lists single-line help messages. The user has no control over the contents of this text box. These messages change based on: 1) mouse movements—displaying help for the control under the current mouse position; and 2) keypad traversals—when a new control has the input focus after a left/right keypad button press, the help text changes for the current control.

OK button: Selection of the OK button will start the slide show with the selected attributes. This button will always be enabled.

CANCEL button: Selection of the CANCEL button will cancel the slide show and return the user to the presentation selector. This button will always be enabled. Slide Show Behavior When a slide show is initially started, a status dialog appears with "opening presentation <name> . . . ." until the operation is complete. During a slide show, the user can press the forward/reverse keys on the remote or the left/right keys on the keypad to move to the next/previous slide. With light activated control device or the remote, a single click will also proceed to the next slide.

The Adobe Acrobat PDF format supports the notion of "hot links": links to other slides or presentations. When the mouse is positioned over a "hot link", the cursor becomes a pointing hand, and selection of the mouse in this area changes the current display to the slide pointed to in the link if the link is in the current file. If the link is not in the current file, an error message dialog is displayed: "Cannot execute this link." To return from a link, the user must press the "return from link/zoom" icon button in the slide show toolbar (see below), or hit the "pause/return" button on the remote (if the slide is not auto-advance). No keypad equivalent for traversing hot links is supported, since this is very cursor dependent.

The user can zoom a specific area of a slide by dragging the mouse and creating a zoom rectangle around an area of interest. To drag with the mouse disk, the user must press the disk for at least 1 second, which starts the drag operation. After dragging and releasing the mouse, the current view becomes a zoom of the area within the rectangle. Successive zooms can continue to be performed. To return from a zoom, the user must press the "return from link/zoom" icon, or hit the "pause/return" button on the remote (if the slide is not auto-advance). The user can also single click on the slide with light activated control device or the remote mouse selection button to return from a zoom. No keypad equivalent for zooming is supported.

If the current transition to the next slide is automatic, hitting the pause button on the remote will stop the timer. The timer will resume when the pause button is hit again, or when the next/previous slide is displayed due to user input (forward/reverse buttons, left/right keys).

While in slide show mode, hitting the system 10 selection key (remote or keypad) brings up a question dialog prompting: "Close Presentation?" with answers "Close" and "Cancel." "Cancel" will have the initial input focus.

Selection of "Close" will end the current slide show and return to the previous state (presentation selector, slide sorter, or title screen).

Selection of "Cancel" will do nothing and return to the slide show.

Hitting the forward key at the end of a slide show which doesn't autowrap, or hitting the reverse key at the beginning, also brings up the "Close Presentation" question dialog.

During a slide show, an optional toolbar is visible in the lower right corner. This toolbar contains 6 icon buttons:

Previous slide icon: when selected, advances to the previous slide (same behavior as reverse key).

Pause icon: when selected, will toggle the automatic timer for a slide with automatic advance. If the timer is running, hitting the pause icon will suspend the timer; if the timer is stopped, it will resume the timer. If the current slide is not auto-advance, selection of the pause icon has no effect.

Stop icon: when selected, brings up the "Close Presentation?" dialog (same behavior as system 10 button)

Return icon: when selected, returns from the last zoom performed. If no zoom was performed, returns from the last link traversed. If no link was traversed, has no effect. Selection of this icon during preview mode has no effect (see preview icon below).

Preview icon: when selected, brings up a small preview window in the lower right corner of the screen. The function of the preview is to allow a user to view other slides in the presentation and go to a selected slide without utilizing the entire screen. When the preview window is up, the only icons which function are the previous slide, next slide, and stop icons. All previous slide/next slide commands apply to the preview window. To exit the preview window, 2 buttons exist above the window: a "goto" button and a "cancel" button. Selection of the "goto" button exits the preview mode and changes the screen to the current slide in the preview window. Selection of the "cancel" button exits the preview mode, and no change occurs on the display.

Next slide icon: when selected, advances to the next slide (same behavior as the forward key).

The toolbar remains on the display until the presentation is exited.

Miscellaneous Errors

Miscellaneous error conditions are checked during system 10 system operation. Some of these include:

removal of the floppy disk by the user during a disk-related operation inability to access a disk due to hardware failure disk change in the middle of a slide show or presentation selection hot links to other files within a slide show files not in PDF format file not editable Projector Menus Interaction must be defined for the situation where a user displays a projector menu during system 10 mode. When this occurs, the system 10 system will essentially freeze, and will accept no user input. The current system 10 display will do the following: 1) if a slide show is in progress, the current slide will remain on the display; 2) if any dialogs are displayed, they will remain on the display while the menus are displayed. The menus will then be projected and will accept all user inputs. After the menus have been removed, the system 10 system will become active, and processing will continue in the same state as before the freeze occurred.

Language selection must be relayed to the system 10 system. When the user selects a language from the projector menus, the system 10 system will be informed of this selection and will change its displays accordingly.

Two levels of self test will be provided in system 10. The first level is the power-on self test. This will run whenever system 10 is reset by the projector or power-up. It will detect any catastrophic failures of the hardware which may have occurred. The power on self test will consist of the following diagnostics:

ROM checksum test

Dynamic RAM tests
 Basic data tests (all 1's, all O's, 55H, and AAH)
 Address consistency test (writes and checks the address and its complement)

Cursory serial port loopback check

Floppy disk controller test

Hard disk check

Video RAM checkout
 same as dynamic RAM

The system 10 communications protocol performs a basic check of the interface as part of its start-up procedure. If the protocol starts, the hardware is working. Disk testing will be very limited on power-up. The diagnostics can check the most basic controller functions for consistency with power-on status. However, the hard disk is optional, and there may be no floppy disk in the drive at power-up.

The second level will be production diagnostics. These are more extensive and can detect subtle failures in specific sections of the hardware. They are intended to be used by production and service personnel.

Normal operation requires constant communication between system 10 and the projector. The projector provides control, status, and user input information to system 10. system 10 also has some limited control over the projector. This system 10 module is responsible for starting, operating, and terminating communications with the projector.

When system 10 is powered up with the projector, system 10 runs an internal diagnostic. If the diagnostic fails, system 10 will transmit an error code to the projector for display. Otherwise, it will begin a startup protocol with the projector. During this phase, the projector and system 10 exchange necessary information such as the projectors characteristics and system 10'copyright string.

Once initialized, either the projector or system 10 can initiate messages. Normally, user actions with the remote will trigger messages from the projector. However, a handful of special events will trigger mode changes by the projector and system 10:

The user inserting a diskette into system 10

The user switching the projector into system 10 mode

The projector igniting its metal halide lamp

The projector using its menus

Projector requesting power-down

This massaging continues until the projector is turned off, or the user switches to some other video source. Communications may be initiated later by either the projector or system 10.

On projectors which can control their own power supplies, the protocol includes a shutdown message and handshake. For those projectors without this control, the system simply powers-off.

Metal halide lamps require high voltage pulses to light. These pulses propagate throughout the projector and can have an adverse effect on system 10's electronics. The firmware will place system 10 into a quiescent and self-protected state before the lamp ignites. After the lamp is started, system 10 resumes where it left off.

The projector controller controls the lamp. When the user pushes the Lamp button, the projector will send a message to system 10 warning it that lamp ignition is coming. System 10 will place itself into a quiet state and send another message telling the projector to proceed. The projector will start the lamp. If the projector controller survives, it will tell system 10 that WWIII is over and it can continue with its presentation.

The suspend/resume facility is critical to reliable operation of the metal halide projector. Any faults here are likely to manifest themselves as intermittent bugs. During this phase of our design, we must identify all areas of the hardware which need to be placed in a quiet mode and/or reinitialized after the lamp is started. We have identified the following items as candidates for suspend/resume processing:

The hard-disk (if attached)

RAM—generate CRC before and check memory contents after lamp start

Serial Port(s)

Floppy disk—park head on an inner track

VGA—ensure that registers haven't changed

IDS INTERFACE CONTROL

Electrical, data link and software protocols for an exemplary system 10 are described below.

Power consumption estimate

The projectors provide 5 V at 3.6 A. Both projectors supply 12 V at 300 mA, and −5 V at 50 mA.

Electrical

Video

Format: VGA, 640×480, 800×600, or 1024×768. All video modes use 16 or 24 bit color.

Signals:

Analog RGB, 0–0.7 V

HSYNC, TTL levels

VSYNC, TTL levels

Pixel clock, TTL levels

Note: We have set a design goal for the projector interface electronics to use the Pixel clock to eliminate SYNC adjustment.

Audio

Format: Standard line levels (100 millivolts). Outputs are provided on the connector but are not supported. They are grounded in this version of IDS.

Signals: Left, Right channels

IDS is connected with a SCSI-1 50 pin connector (AMP part number 749070-5).

Connector Pin Assignments

| Pin | Signal Name | Pin | Signal Name |
|-----|-------------|-----|-------------|
| 1 | GND | 2 | Analog RED |
| 3 | AGND | 4 | Analog GREEN |
| 5 | AGND | 6 | Analog BLUE |
| 7 | AGND | 8 | Dot Clock |
| 9 | GND | 10 | HSYNC |
| 11 | GND | 12 | VSYNC |
| 13 | GND | 14 | RxD (TTL) |
| 15 | TxD (TTL) | 16 | /CTS (TTL) |
| 17 | /RTS (TTL) | 18 | GND |
| 19 | /RESET | 20 | GND |
| 21 | IDS_AUDIO_L | 22 | IDS_AUDIO_R |
| 23 | GND | 24 | GND |
| 25 | GND | | |
| 1A | GND | 2A | −5 volts |
| 3A | −5 volts | 4A | GND |
| 5A | GND | 6A | +5 volts |
| 7A | +5 volts | 8A | GND |
| 9A | +5 volts | 10A | +5 volts |

-continued

Connector Pin Assignments

| Pin | Signal Name | Pin | Signal Name |
|-----|-------------|-----|-------------|
| 11A | GND         | 12A | +5 volts    |
| 13A | +5 volts    | 14A | GND         |
| 15A | +5 volts    | 16A | +5 volts    |
| 17A | GND         | 18A | GND         |
| 19A | +12 volts   | 20A | +12 volts   |
| 21A | GND         | 22A | +12 volts   |
| 23A | GND         | 24A | GND         |
| 25A | GND         |     |             |

Projector/IDS Communications Link

Format: Standard asynchronous serial port, RS-232; 19,200 baud, 8-bits, one stop bit, no parity Signals: RxData, TxData, CTS, RTS, all TTL level; RTS and CTS are used for hardware flow control.

Software

The data stream protocol is intended to be a simple means of communication between IDS and a Proxima projector. We can easily extend this protocol to support other types of interfaces in future products.

Goals:

The protocol shall allow for future expansion.

The protocol shall provide IDS enough information to accommodate future projector resolutions and facilities.

The protocol shall be compatible with light activated control device and mouse data streams.

Assumptions:

The link will be fundamentally reliable. Messages will not be lost by either the projector or IDS.

Link Characteristics 19.2 K baud 8 data bits 1 stop bit no parity full duplex

Hardware handshaking

Message Encoding

Messages consist of a command header byte followed by a variable number of data bytes. Each byte is tagged in bits 6 and 7. The tags allow us to resynchronize should a message get lost. Either the projector or IDS can request retransmission of the previous message. This would normally occur when a UART overrun error is detected.

We assign the following tag values:

00 Data byte for previous command

01 Light activated control device status report

10 IDS protocol command

11 Reserved

[The protocol can be extended here if it becomes necessary to send large amounts of binary information. Large blocks of data can be transmitted using the reserved tag as an escape into an 8 bit data mode.]

Some data items require multiple bytes to contain their values. The required value will be encoded into a fixed number of bytes which are defined in the message format section. Because of the tags, we can only encode 6 bits into each byte. Multibyte values should be sent most significant byte first.

Light Activated Control Device Messages

The projector sends the external user interface events to IDS (or any host) in light activated control device packets. These packets are structurally similar to Microsoft™ mouse messages. However, light activated control device is an absolute pointing device as opposed to the relative movements of a mouse.

Light Activated Control Device Terms & Definitions

Active area: The area where active video information is displayed. The four corners of the active area are defined during light activated control device calibration.

Click: Light turns on, then off in the active area or Double Click region.

Total Projected area: The complete area that has projected light, this includes the area that is unused when not in a 480 vertical line mode.

Light activated control device location: The location of the light in the active area expressed in absolute coordinates.

Light activated control device calibration: The 4 corners of the active area are clicked in sequence under direction of the projector controller.

Double Click Short-cut

If the light 'went away' when it was inside the active area, and then appears about 1 inch or more below the active area, light activated control device will output a button down, button up, button down, button up, sequence at the last known location in the active area. If the light appears in the Double Click region again without appearing in the active area it will be ignored by light activated control device.

Light Activated Control Device/Mouse Data Record

Byte 0

01LR YYXX
L = Left Mouse Button;
R = Right Mouse Button;
X = X MSB's;
Y = Y MSB's Byte 1

00CK KKKK
C = Center Mouse Button;
KKKKK = Event Code

| Event Code | Key | Description |
|------------|-----|-------------|
| 00000 |  | Light Activated Control Device Data |
| 00101 | fwd | Forward |
| 00110 | rev | Reverse |
| 00111 | pause | Pause |
| 01000 | sel | Select/Prog-1/Prog-2 |
| 00001 | ↑ | Cursor Up |
| 00010 | ↓ | Cursor Down |
| 00011 | ← | Cursor Left |
| 00100 | → | Cursor Right |
| 01001–11010 |  | reserved |
| 11011 |  | Previous key released |
| 11100–11110 |  | reserved |
| 11111 |  | Relative Mouse movement |

Bytes 2–5

```
               7 6 5 4 3 2 1 0   7 6 5 4 3 2 1 0    bit #
X data format: 0 0 X X X X X X   0 0 X X X X X X    bytes 2,3
                                                    lsb bits
                                                    11-0
Y data format: 0 0 Y Y Y Y Y Y   0 0 Y Y Y Y Y Y    bytes 4,5
                                                    lsb bits
                                                    11-0
```

Light activated control device returns X/Y values in the range of: 0,0–8191,8191 absolute. There are 14 bits for X/Y location, bits 13-0, bit 13=0. (reserved) light activated control device is a single left button device, if the bit is a '1' the button state is down, if a '0' the button is up. Make sure that if the right button bit is set that it will be processed as the right button. Code the driver to support both buttons.

Relative Mouse Movement

The Mouse button bits and the least significant 8 bits of X & Y location are valid. X and Y are 8-bit signed values.

Light Activated Control Device Event Detection

If a spot of light is detected after calibration, the following events occur:

1. A Light Activated Control Device record with a but ton state of up, at the coordinates that corresponds to the location of the light is sent to the host.
2. A record with a button state of down, is sent with the same coordinates.
3. If the spot is still detected and it moves, record s with a button of down and the new location will be sent. Light activated control device will continue to send new records of the spots location as long as the spot is detected and moving. If the spot stops moving but the light is still detected, light activated control device will not send any new records.
4. If the light goes away, light activated control device will send a record with a button state of up, at the last known position of the light in the active area. If the light is 'dragged off' the screen, but is still in the field of view, the cursor will be confined to the active area.

IDS Specific Messages

This is a peer to peer protocol. Either IDS or the projector can initiate communications. The first three letters of the message name indicate the originating party.

The IDS sends this message to the projector during startup. The projector returns a message to provide IDS the information it needs to properly generate pictures for the projector. This is a single byte message.

Query Response [PRJ_QUERY_RESPONSE]

| Byte | Description |
| --- | --- |
| 0 | Command byte, 81H |
| 1 | Protocol version, 01H |
| 2,3,4 | X resolution in pixels |
| 5,6,7 | Y Resolution in pixels |
| 8 | Current Language |
| 9 | Color resolution (see below) |
| 10 | Interface Type, enumerated |
| 11–15 | Reserved for future expansion. These values should be 0. |

The projector sends this message in response to an IDS_QUERY_PROJECTOR message. The contents of the message should describe the projector's hardware characteristics. Screen resolution and color capabilities should refer to the intrinsic capabilities of the display panel in the projector. The projector should assume that IDS will want to operate at the maximum available resolution.

The protocol is currently set at 1. This number will increase in future versions.

Current Language uses the same enumerated values as PRJ_NEW_LANGUAGE.

Message Summary

| Message | Number | Description |
| --- | --- | --- |
| IDS_QUERY_PROJECTOR | 80H | Inquire projector characteristics |
| PRJ_QUERY_RESPONSE | 81H | Return projector characteristics |
| IDS_READY | 82H | The IDS is ready to begin normal operation |
| PRJ_NEW_LANGUAGE | 83H | The projector is using a new language. |
| PRJ_MENU_BREAK | 84H | The projector needs to bring up its menus |
| IDS_MENU_DOWN | 85H | The projector is clear to bring up its menus |
| PRJ_MENU_RESUME | 86H | IDS is clear to resume menuing |
| PRJ_SHUTDOWN | 87H | The projector is turning power off. |
| IDS_ACK_SHUTDOWN | 88H | IDS is ready to shut down |
| PRJ_SUSPEND | 89H | Suspend IDS operations |
| IDS_SUSPEND_ACK | 8AH | Acknowledge Suspend Request |
| PRJ_RESUME | 8BH | Resume IDS operations |
| PRJ_I_HEAR_YOU | 8CH | The projector is ready to communicate |
| IDS_I_AM_HERE | 8DH | IDS is attached |
| REPEAT_MESSAGE | 8EH | Repeat last message |
| IDS_ACTIVATING | 8FH | Switch projector to IDS mode |
| PRJ_READY | 90H | Projector has switched to IDS mode |
| PRJ_SHOWTIME | 91H | The user has switched to IDS mode |
| IDS_SHOWTIME_ACK | 92H | IDS is ready to play |
| IDS_SELFTEST_FAIL | 93H | IDS failed its power-on self test |
| IDS_COPYRIGHT | 94H | IDS copyright message |
| PRJ_COPYRIGHT_ACK | 95H | Projector acknowledges copyright message |
| IDS_RESUME_ACK | 96H | IDS is resuming operation after SUSPEND |
| IDS_RESUME_FAIL | 97H | IDS is unable to resume after SUSPEND |

IDS query to the projector [IDS_QUERY_PROJECTOR]

| Byte | Description |
| --- | --- |
| 0 | Command byte, 80H |

Color resolution is the number of bits required to represent full resolution color information. IDS assumes red, green, and blue precisions are identical. The projector should supply a value which represents the available color resolution without spatial dithering.

Interface Type is an enumerated value which tells IDS which connector to use. There are currently two values defined.

1—Analog VGA
2—Projector 12 Digital

| IDS Ready [IDS_READY] | |
|---|---|
| Byte | Description |
| 0 | Command, 82H |

This single byte command informs the projector that IDS is ready to process mouse, Light activated control device or remote commands.

| Switch Menu Language [PRJ_NEW_LANGUAGE] | |
|---|---|
| Byte | Description |
| 0 | Command, 83H |
| 1 | New_language, enum |

The projector sends this message to the IDS whenever the user changes the projector's language setting. This enables IDS to change its menu language setting in tandem with the or. The following enumerations are defined:

0—English
1—German
2—French
3—Spanish
4—Italian

| Projector Menu Break [PRJ_MENU_BREAK] | |
|---|---|
| Byte | Description |
| 0 | Command, 84H |

The projector sends this message to the IDS when it needs to display its own menus for the user. Upon receiving this message, IDS will blank any menus it may have on the screen. If it is a slide on the screen, that slide will remain. The menuing break will also pause an automatic presentation.

| IDS Menus Down [IDS_MENU_DOWN] | |
|---|---|
| Byte | Description |
| 0 | Command, 85H |

IDS sends this message to the projector when it is clear to put its menus on the screen.

| Projector Menu Resume [PRJ_MENU_RESUME] | |
|---|---|
| Byte | Description |
| 0 | Command, 86H |

The projector sends this message to IDS when it has remove its menus from the screen. IDS will replace its menus if it had any up when the projector sent a PRJ_MENU_BREAK.

| Shutdown IDS [PRJ_SHUTDOWN] | |
|---|---|
| Byte | Description |
| 0 | Command, 87H |

The projector sends this command to IDS when it wants to turn off the power. IDS will finish its shutdown and send IDS_ACK_SHUTDOWN back to the projector.

| IDS acknowledge [IDS_ACK_SHUTDOWN] | |
|---|---|
| Byte | Description |
| 0 | Command, 88H |

IDS sends an IDS_ACK_SHUTDOWN message to the projector after it has finished its shutdown procedure. The projector will then shutdown the IDS by turning off its power.

| Suspend IDS operations [PRJ_SUSPEND] | |
|---|---|
| Byte | Description |
| 0 | Command, 89H |

Metal halide lamps generate something similar to the EMP from a nuclear explosion. As a safeguard against bizarre behavior from IDS, the projector will warn IDS before it ignites the metal halide lamp. IDS will enter a state of suspended animation, then transmit an IDS_SUSPEND_ACK message back to the projector.

| Acknowledge Suspend Request [IDS_SUSPEND_ACK] | |
|---|---|
| Byte | Description |
| 0 | Command, 8AH |

IDS sends this message to the projector when it has suspended operations. The projector will then start the metal halide lamp.

| Resume IDS operations [PRJ_RESUME] | |
|---|---|
| Byte | Description |
| 0 | Command, 8BH |

The projector will send this command to IDS when it is clear to resume normal operations. IDS will verify contents of memory and proceed normally if they check out. If memory was irretrievably altered, it will reset itself.

| Projector ready to communicate with IDS [PRJ_I_HEAR_YOU] | |
|---|---|
| Byte | Description |
| 0 | Command, 8CH |

The projector send this message in response to IDS_I_AM_HERE. Once this message is sent, IDS will continue with its projector startup protocol. The projector should not send this message until it is ready for full communications with IDS.

| IDS is attached [IDS_I_AM_HERE] | |
|---|---|
| Byte | Description |
| 0 | Command, 8DH |

IDS will send this message when it begins its powerup diagnostic. The projector will respond with PRJ_I_HEAR_YOU.

| Repeat Message [REPEAT_MESSAGE] | |
|---|---|
| Byte | Description |
| 0 | Command, 8EH |

The projector can send this message when needs the last message transmitted to be re-sent. IDS will retransmit the previous message. The projector side should support this command eventually.

| Switch projector to IDS mode [IDS_ACTIVATING] | |
|---|---|
| Byte | Description |
| 0 | Command, 8FH |

IDS sends this message when it wants the projector to set its video source to IDS. When the mode switch is complete, the projector will send a PRJ_READY message.

| Projector has switched to IDS mode [PRJ_READY] | |
|---|---|
| Byte | Description |
| 0 | Command, 90H |

The projector sends this message to report it has completed the requested switch to IDS Mode.

| The user has switched to IDS mode [PRJ_SHOWTIME] | |
|---|---|
| Byte | Description |
| 0 | Command, 91H |

The projector sends this message to report the user has requested a switch to IDS Mode. When the mode switch is complete, IDS will send an IDS_SHOWTIME_ACK message.

| IDS is ready to play [IDS_SHOWTIME_ACK] | |
|---|---|
| Byte | Description |
| 0 | Command, 92H |

IDS sends this message to report it is ready to run a presentation.

| IDS failed self-test [IDS_SELFTEST_FAIL] | |
|---|---|
| Byte | Description |
| 0 | Command, 93H |
| 1 | Failure code |

IDS sends this message to report selftest failure. Valid failure codes will be in the range of 0 to 4 FH.
The following failure codes are defined by IDS:
0h ROM checksum failure
1h RAM data test failed
2h RAM address test failed
3h Video test failed
4h Floppy disk test failed
5h Hard disk failed

| IDS copyright message [IDS_COPYRIGHT] | |
|---|---|
| Byte | Description |
| 0 | Command, 94H |
| 1..n | Copyright string data (see below) |

IDS sends this message to give its copyright information to the projector. The projector will then display this information as part of its startup screen.
The string is a special format due to the limitations of 6 bit ASCII encoding. Each character is encoded across 2 bytes. The high nibble of each character precedes the low nibble.
The string will be 128 characters max.
A null (00H) byte will terminate the message.

| Acknowledge copyright message [PRJ_COPYRIGHT_ACK] | |
|---|---|
| Byte | Description |
| 0 | Command, 95H |

The projector sends this message to acknowledge the copyright message.

| Acknowledge resume message [IDS_RESUME_ACK] | |
|---|---|
| Byte | Description |
| 0 | Command, 96H |

IDS sends this message to acknowledge a successful restart after suspending for metal halide lamp ignition.

| Acknowledge resume message [IDS_RESUME_FAIL] | |
|---|---|
| Byte | Description |
| 0 | Command, 97H |

IDS sends this message to signal failure after suspending for metal halide lamp ignition.
Sequence of events Most messages in the IDS protocol have a request followed by an acknowledge message. Where a response is required, both IDS and the projector are required to provide one within 30 seconds.

| IDS | Projector |
|---|---|
| | Startup |
| IDS_I_AM_HERE | |
| | PRJ_I_HEAR_YOU |
| IDS_COPYRIGHT | |
| | PRJ_COPYRIGHT_ACK |
| IDS_QUERY_PROJECTOR | |
| | PRJ_QUERY_RESPONSE |
| [IDS Completes Initialization] | |
| IDS_READY | |
| | <Status Messages> |
| | with |
| | Interruptions for Menuing |
| | Startup with Failing Self Test |
| IDS_SELFTEST_FAIL | |
| | <projector displays fail report> |
| | Suspend for Menuing |
| | PRJ_MENU_BREAK |
| [IDS takes down its menus] | |
| IDS_MENU_DOWN | |
| | PRJ_MENU_RESUME |
| [IDS resumes normal operation] | |
| | Suspend for Lamp Ignition |
| | PRJ_SUSPEND |
| [IDS goes into suspend state] | |
| IDS_SUSPEND_ACK | |
| | PRJ_RESUME |
| [IDS resumes normal operation] | |
| IDS_RESUME_ACK | |
| -or- | |
| IDS_RESUME_FAIL | |
| -or- | |
| <timeout> | |
| | Shutdown |
| | PRJ_SHUTDOWN |
| IDS_ACK_SHUTDOWN | |
| | [Projector turns off power] |
| | IDS Initiated Mode switch |
| IDS_ACTIVATING | |
| | [Projector switches itself to IDS mode] |
| | PRJ_READY |
| [IDS runs its presentation] | |
| | Projector Initiated Mode switch |
| | PRJ_SHOWTIME |
| [IDS Activates itself] | |
| IDS_SHOWTIME_ACK | |

Figure 10:
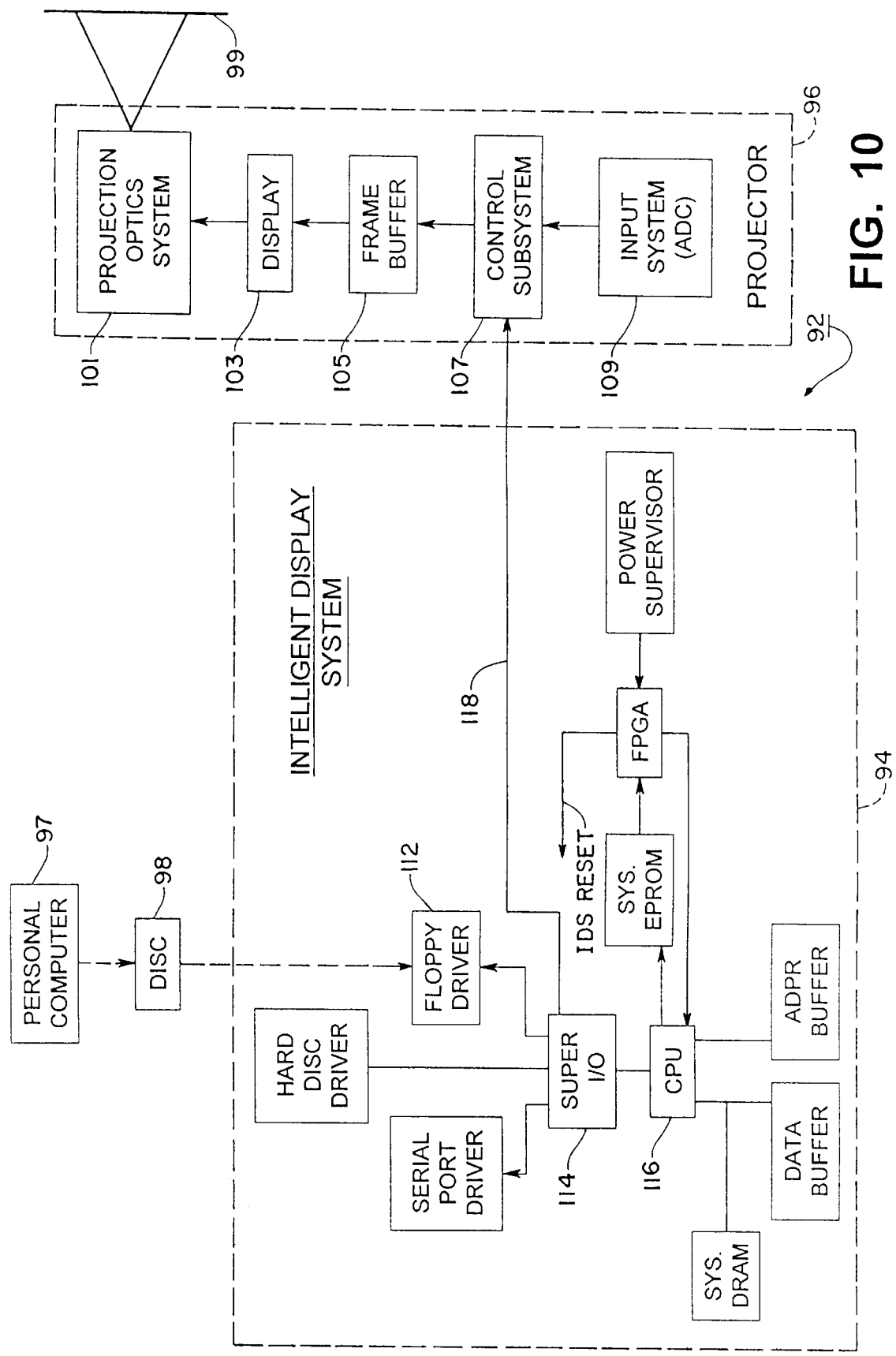
FIG. 10 is a block diagram of another intelligent display system presentation projection arrangement, which is constructed in accordance with the present invention.

Referring now to FIG. 10, there is shown a presentation projection arrangement 92, which is also constructed in accordance with the present invention, and which is similar to the presentation projection arrangement 5 of FIG. 1, except that the arrangement 92 does not employ a graphics controller, nor a frame buffer. The arrangement 92 includes an intelligent display system 94, which is generally similar to the intelligent display system 10 (FIG. 1), for controlling a projector 96, which is generally similar to the projector 12 of FIG. 1. A personal computer 97 is similar to the personal computer 21 of FIG. 1, and is able to store presentation information in a portable document format file onto a diskette 98 in a similar manner as described in connection with the personal computer 21 of FIG. 1.

When the diskette 98 is loaded into the intelligent display system 94, it controls the projector 96 to project the presentation images onto a remotely located viewing surface 99 in a similar manner as performed by the projector 12 of FIG. 1.

The projector 96 includes a projection optics system 101, which is driven optically by a liquid crystal display panel 103 via a frame buffer 105 in response to a control subsystem 107. An input system 109 in the form of an analog-to-digital converter can supply digital presentation information to the control subsystem 107 from a separate computer in a manner similar to the input system 29 of the projector 12.

In accordance with the present invention, the intelligent display system 94 provides digital display information directly to the control subsystem 107.

Considering now the intelligent display system 94 in greater detail, it includes a floppy driver 112 for receiving the diskette 98 in a manner similar to the floppy driver 48 of the system 10 of FIG. 1. A super input/output unit 114, is similar to the unit 52 of FIG. 1, and conveys the presentation information to a computer processor unit 116, which is generally similar to the computer processor unit 54 of FIG. 1. The portable document format information is converted into digital presentation information in a similar manner as described in connection with the description of the intelligent display system 10 of FIG. 1. However, instead of supplying the information on a frame-by-frame basis from the graphics controller 58 and the frame buffer 61 of FIG. 1, the digital presentation information, after being converted from the portable document format information, is supplied directly from the upper input/output unit via a cable 118 directly to the control subsystem 107 of the projector 96. In this manner, the frame buffer 105 then cooperates with the control subsystem 107 to generate each individual frame of presentation information, which is then supplied to the display panel 103 for projecting onto the viewing surface 99 via the optics system 101.

In this manner, the intelligent display system 95 does not require a separate frame buffer and graphics controller. Thus, the intelligent display system 95 is lower in cost to manufacture, and is a more direct functioning system.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A presentation projection arrangement for use with presentation information to be used to display presentation images developed on a computer means, comprising:

a projection display unit including a display panel for projecting the projection images indicative of the presentation information;

presentation developmental means for converting said presentation information into portable document format information independent of the type of kind of developmental software utilized by said computer means;

an intelligent display system for responding to said portable document format information to drive said projection display unit to project the display presentation images;

means for supplying said portable document format information to said intelligent display system for utilizing said format information therein;

means responsive to the portable format information for converting it to presentation display information; and controlling means responsible to the converted presentation display information for driving the display panel of the projecting display unit for causing the presentation images to be projected onto a remotely located viewing surface.

2. An arrangement according to claim 1, wherein said means for supplying said portable document format information includes a portable memory storage media.

3. An arrangement according to claim 2, wherein said storage media comprises a diskette.

4. An arrangement according to claim 1, wherein said projection display unit includes an analog-to-digital converter input system for supplying digital presentation information to said display panel, said controller means for supplying analog presentation information to said input system for converting the analog presentation information to digital presentation information.

5. An arrangement according to claim 1, wherein said projection display unit includes a digital control subsystem for supplying digital presentation information to said display panel, said controller means for supplying digital presentation information to said control subsystem.

6. An arrangement according to claim 1, wherein said projection display unit is a projector, and further includes another projector having another display panel for projecting other images indicative of other presentation information, said controller means for driving said another display panel of said another projector.

7. An arrangement according to claim 1, wherein said projection display unit includes a projector having a control subsystem for driving its display panel, said intelligent display system having its controller supplying digital presentation information continuously to said control subsystem, said projector having a frame buffer, said control subsystem responsive to the supplied presentation information for developing individual frames of presentation information utilizing the projector frame buffer.

8. An arrangement according to claim 1, wherein said intelligent display system includes a frame buffer, wherein said controller means utilizes said frame buffer to develop presentation information in a sequence of individual frames, said controller means for supplying the presentation information to the projection display unit in a frame-by-frame manner.

9. An arrangement according to claim 1, further including means for displaying a tool bar image to help preview presentation information.

10. An arrangement according to claim 1, wherein said portable document format information includes presentation transition effect information.

11. A method of projecting presentation images, comprising:

developing presentation information with a computer means to be used to display presentation images;

projecting the presentation images indicative of said presentation information with a projection display unit having a display panel;

converting said presentation information into portable document format information independent of the type or kind of developmental software utilized by said computer means;

responding to said portable document format information to drive said projection display unit to project the presentation images;

supplying said portable document format information to said intelligent display system for utilizing said format information therein;

converting said portable document format information to presentation display information; and driving the display panel of the projection display unit for causing the presentation images to be projected onto a remotely located viewing surface.

12. A method according to claim 11, further including supplying digital presentation information to said display panel with an input system, supplying analog presentation information to said input system, and converting the analog presentation information to digital presentation information.

13. A method according to claim 11, further including supplying digital presentation information to said display panel with a control subsystem, and supplying digital presentation information to said control subsystem.

14. A method according to claim 11, further including projecting other images indicative of other presentation information with another display panel, and driving said another display panel.

15. A method according to claim 11, further including driving said display panel with a control subsystem, supplying digital presentation information continuously to said control subsystem, and developing individual frames of presentation information utilizing a projector frame buffer.

16. A method according to claim 11, further including developing presentation information in a sequence of individual frames, and supplying the presentation information to the projection display unit in a frame-by-frame manner.

17. A method according to claim 11, further including displaying a tool bar image to help preview presentation information.

18. An arrangement according to claim 1, further including computer means having presentation developmental software stored therein for developing the presentation information.

* * * * *